United States Patent
Slocum et al.

(10) Patent No.: US 12,539,157 B2
(45) Date of Patent: Feb. 3, 2026

(54) LINEAR ELECTRIC SURGICAL HAMMER IMPACT TOOL

(71) Applicant: Zimmer, Inc., Warsaw, IN (US)

(72) Inventors: Alexander Slocum, Bow, NH (US); Nitin Goyal, Mclean, VA (US)

(73) Assignee: Zimmer, Inc., Warsaw, IN (US)

( * ) Notice: Subject to any disclaimer, the term of this patent is extended or adjusted under 35 U.S.C. 154(b) by 770 days.

(21) Appl. No.: 17/581,316

(22) Filed: Jan. 21, 2022

(65) Prior Publication Data

US 2022/0226033 A1    Jul. 21, 2022

Related U.S. Application Data

(60) Provisional application No. 63/140,071, filed on Jan. 21, 2021.

(51) Int. Cl.
*A61B 17/92* (2006.01)
*A61F 2/46* (2006.01)
*A61B 17/00* (2006.01)

(52) U.S. Cl.
CPC .... *A61B 17/92* (2013.01); *A61B 2017/00022* (2013.01); *A61B 2017/924* (2013.01); *A61B 2017/928* (2013.01); *A61F 2002/4681* (2013.01)

(58) Field of Classification Search
CPC ........ A61F 2002/4681; H02K 2207/03; A61B 2017/00371

See application file for complete search history.

(56) References Cited

U.S. PATENT DOCUMENTS

| | | | |
|---|---|---|---|
| 974,267 | A | 11/1910 | Hennessy et al. |
| 2,270,929 | A | 1/1942 | Bugg |
| 2,323,375 | A | 7/1943 | Bugg |
| 2,353,321 | A | 7/1944 | Snodgrass |

(Continued)

FOREIGN PATENT DOCUMENTS

| | | |
|---|---|---|
| AU | 2019203142 A1 | 11/2019 |
| AU | 2020200771 A1 | 2/2020 |

(Continued)

OTHER PUBLICATIONS

"U.S. Appl. No. 17/523,540, Notice of Allowance mailed Apr. 22, 2024", 10 pgs.

(Continued)

*Primary Examiner* — David W Bates
(74) *Attorney, Agent, or Firm* — SCHWEGMAN LUNDBERG & WOESSNER, P.A.

(57) ABSTRACT

Disclosed herein are linear electric surgical hammer impact tools and methods of use thereof. The linear electric surgical hammer impact tools can include a housing, a slider, a shuttle, and a motor. The housing can define a cavity extending along a longitudinal axis of the housing. The slider can be located inside the cavity and arranged along the longitudinal axis of the housing. The shuttle can be located inside the cavity and arranged along the longitudinal axis of the housing. The shuttle can include a first set of collars and a second set of collars. The motor can be configured to drive the slider along the longitudinal axis in a first direction and a second direction. Motion of the slider in the first and second directions can cause the slider to contact the first and second sets of collars.

15 Claims, 18 Drawing Sheets

(56) References Cited

U.S. PATENT DOCUMENTS

| | | | |
|---|---|---|---|
| 2,542,695 A * | 2/1951 | Neff | A61B 17/92 |
| | | | D24/142 |
| 2,576,851 A | 11/1951 | Newman | |
| 2,655,921 A | 10/1953 | Haboush | |
| 2,657,383 A | 11/1953 | Siering et al. | |
| 3,450,215 A | 6/1969 | Emery | |
| 3,472,323 A | 10/1969 | Hall | |
| 3,626,935 A | 12/1971 | Pollock et al. | |
| 3,752,161 A | 8/1973 | Bent | |
| 3,829,974 A | 8/1974 | McShirley | |
| 4,298,074 A | 11/1981 | Mattchen | |
| 4,466,429 A | 8/1984 | Loscher et al. | |
| 4,651,833 A | 3/1987 | Karpf et al. | |
| 4,834,092 A | 5/1989 | Alexson et al. | |
| 5,057,112 A | 10/1991 | Sherman et al. | |
| 5,108,400 A | 4/1992 | Appel et al. | |
| 5,152,352 A | 10/1992 | Mandanis | |
| 5,163,519 A | 11/1992 | Mead et al. | |
| 5,210,918 A | 5/1993 | Wozniak et al. | |
| 5,282,805 A | 2/1994 | Richelsoph et al. | |
| 5,352,230 A | 10/1994 | Hood | |
| 5,353,230 A | 10/1994 | Maejima et al. | |
| 5,363,726 A | 11/1994 | Smith | |
| 5,431,660 A | 7/1995 | Burke | |
| 5,485,887 A * | 1/1996 | Mandanis | B25D 17/06 |
| | | | 173/91 |
| 5,553,675 A | 9/1996 | Pitzen et al. | |
| 5,868,756 A | 2/1999 | Henry et al. | |
| 6,126,694 A | 10/2000 | Gray, Jr. | |
| 6,159,214 A | 12/2000 | Michelson | |
| 6,264,660 B1 | 7/2001 | Schmidt et al. | |
| 6,264,661 B1 | 7/2001 | Jerger et al. | |
| 6,368,324 B1 | 4/2002 | Dinger | |
| 6,520,266 B2 | 2/2003 | Bongers-Ambrosius et al. | |
| 6,626,913 B1 | 9/2003 | Mckinnon et al. | |
| 6,814,738 B2 | 11/2004 | Naughton et al. | |
| 6,868,918 B2 | 3/2005 | Shinohara | |
| 7,090,677 B2 | 8/2006 | Fallin et al. | |
| 7,189,241 B2 | 3/2007 | Yoon et al. | |
| 7,637,327 B2 | 12/2009 | Grunig | |
| 7,874,839 B2 | 1/2011 | Bouneff | |
| 8,002,776 B2 | 8/2011 | Liu et al. | |
| 8,393,409 B2 | 3/2013 | Pedicini | |
| 8,444,647 B2 | 5/2013 | Walen et al. | |
| 8,465,492 B2 | 6/2013 | Estes | |
| 8,556,901 B2 | 10/2013 | Anthony et al. | |
| 8,602,124 B2 | 12/2013 | Pedicini | |
| 8,695,726 B2 | 4/2014 | Pedicini | |
| 8,894,654 B2 | 11/2014 | Anderson | |
| 8,936,105 B2 | 1/2015 | Pedicini | |
| 8,936,106 B2 | 1/2015 | Pedicini | |
| 9,168,154 B2 | 10/2015 | Behzadi | |
| 9,186,158 B2 | 11/2015 | Anthony et al. | |
| 9,198,675 B2 | 12/2015 | Nelson et al. | |
| 9,220,612 B2 | 12/2015 | Behzadi | |
| 9,554,965 B2 | 1/2017 | Foehrenbach | |
| 9,629,641 B2 | 4/2017 | Ferro et al. | |
| 9,649,202 B2 | 5/2017 | Behzadi et al. | |
| 9,877,734 B2 | 1/2018 | Anderson et al. | |
| 9,901,354 B2 | 2/2018 | Pedicini | |
| 9,931,151 B2 | 4/2018 | Donald et al. | |
| 9,943,318 B2 | 4/2018 | Anthony et al. | |
| RE46,954 E | 7/2018 | Pedicini | |
| 10,028,754 B2 | 7/2018 | Johnson et al. | |
| RE46,979 E | 8/2018 | Pedicini | |
| 10,159,500 B2 | 12/2018 | Chavarria et al. | |
| 10,172,722 B2 | 1/2019 | Behzadi | |
| 10,245,160 B2 | 4/2019 | Behzadi | |
| 10,245,162 B2 | 4/2019 | Behzadi | |
| 10,251,663 B2 | 4/2019 | Behzadi | |
| 10,299,930 B2 | 5/2019 | Behzadi | |
| 10,342,591 B2 | 7/2019 | Pedicini | |
| 10,368,882 B2 | 8/2019 | Ferro et al. | |
| 10,413,425 B2 | 9/2019 | Behzadi | |
| 10,426,540 B2 | 10/2019 | Behzadi | |
| 10,441,244 B2 | 10/2019 | Behzadi | |
| 10,456,271 B2 | 10/2019 | Behzadi | |
| 10,463,505 B2 | 11/2019 | Behzadi | |
| 10,470,897 B2 | 11/2019 | Behzadi | |
| 10,478,318 B2 | 11/2019 | Behzadi | |
| 10,568,643 B2 | 2/2020 | Johnson et al. | |
| 10,603,173 B2 | 3/2020 | Carr et al. | |
| RE47,963 E | 4/2020 | Pedicini | |
| 10,610,379 B2 | 4/2020 | Behzadi | |
| RE47,997 E | 5/2020 | Pedicini | |
| 10,653,533 B2 | 5/2020 | Behzadi | |
| 10,660,767 B2 | 5/2020 | Behzadi | |
| 10,729,559 B2 | 8/2020 | Behzadi et al. | |
| RE48,184 E | 9/2020 | Pedicini | |
| RE48,251 E | 10/2020 | Pedicini | |
| 11,013,503 B2 | 5/2021 | Pedicini | |
| 11,490,943 B2 | 11/2022 | Halat et al. | |
| 11,918,268 B2 * | 3/2024 | Doyle | A61B 17/92 |
| 11,925,359 B2 | 3/2024 | Slocum et al. | |
| 12,004,793 B2 | 6/2024 | Levy | |
| 12,064,158 B2 | 8/2024 | Marinkovich | |
| 12,070,256 B2 | 8/2024 | Slocum et al. | |
| 12,251,148 B2 | 3/2025 | Slocum | |
| 2004/0026097 A1 | 2/2004 | Hecht | |
| 2007/0282345 A1 | 12/2007 | Yedlicka et al. | |
| 2010/0137760 A1 | 6/2010 | Schulz et al. | |
| 2011/0245833 A1 * | 10/2011 | Anderson | A61B 17/1628 |
| | | | 606/80 |
| 2011/0255927 A1 | 10/2011 | Boudreau et al. | |
| 2011/0270256 A1 | 11/2011 | Nelson et al. | |
| 2012/0172939 A1 | 7/2012 | Pedicini | |
| 2012/0215267 A1 | 8/2012 | Pedicini | |
| 2012/0259339 A1 | 10/2012 | Hood et al. | |
| 2013/0161050 A1 * | 6/2013 | Pedicini | B25D 17/00 |
| | | | 173/201 |
| 2013/0261681 A1 * | 10/2013 | Bittenson | A61B 17/92 |
| | | | 606/86 R |
| 2014/0318819 A1 * | 10/2014 | Pedicini | A61B 17/1604 |
| | | | 173/2 |
| 2014/0318823 A1 * | 10/2014 | Pedicini | A61B 17/1628 |
| | | | 173/201 |
| 2015/0196343 A1 | 7/2015 | Donald et al. | |
| 2016/0199199 A1 * | 7/2016 | Pedicini | A61B 17/92 |
| | | | 606/100 |
| 2017/0020536 A1 | 1/2017 | Johnson et al. | |
| 2017/0056205 A1 | 3/2017 | Biegun et al. | |
| 2018/0001447 A1 | 1/2018 | Lam et al. | |
| 2018/0055518 A1 | 3/2018 | Pedicini | |
| 2018/0055552 A1 | 3/2018 | Pedicini | |
| 2018/0303496 A1 | 10/2018 | Johnson et al. | |
| 2018/0318089 A1 | 11/2018 | Carr et al. | |
| 2018/0338751 A1 | 11/2018 | Pedicini | |
| 2018/0360464 A1 | 12/2018 | Irvine | |
| 2019/0070719 A1 | 3/2019 | Liang et al. | |
| 2019/0167434 A1 | 6/2019 | Satterthwaite et al. | |
| 2019/0183554 A1 | 6/2019 | Pedicini | |
| 2019/0216521 A1 | 7/2019 | Chhatrala | |
| 2019/0247057 A1 | 8/2019 | Anderson | |
| 2019/0282286 A1 | 9/2019 | Pedicini | |
| 2019/0350725 A1 * | 11/2019 | Behzadi | A61F 2/4657 |
| 2020/0060693 A1 | 2/2020 | Sweitzer | |
| 2020/0178998 A1 * | 6/2020 | Behzadi | A61B 17/1675 |
| 2022/0142693 A1 | 5/2022 | Slocum et al. | |
| 2022/0240946 A1 | 8/2022 | Slocum et al. | |
| 2022/0240947 A1 | 8/2022 | Marinkovich | |
| 2022/0240998 A1 | 8/2022 | Slocum | |
| 2022/0273317 A1 | 9/2022 | Levy | |
| 2022/0323134 A1 | 10/2022 | Lyon et al. | |
| 2022/0361934 A1 | 11/2022 | Pedicini | |
| 2023/0240735 A1 | 8/2023 | Doyle | |
| 2023/0285062 A1 * | 9/2023 | Santos | A61F 2/4603 |
| 2024/0024012 A1 * | 1/2024 | Dittrich | A61B 17/92 |
| 2024/0299072 A1 | 9/2024 | Grimm et al. | |

FOREIGN PATENT DOCUMENTS

| | | | |
|---|---|---|---|
| AU | 2021239844 A1 | 10/2022 | |
| AU | 2017320580 B2 | 4/2023 | |

(56) References Cited

FOREIGN PATENT DOCUMENTS

| | | |
|---|---|---|
| AU | 2021378282 A1 | 6/2023 |
| AU | 2022227599 A1 | 8/2023 |
| AU | 2021378282 | 10/2024 |
| AU | 2022212126 B2 | 11/2024 |
| AU | 2022212275 B2 | 11/2024 |
| AU | 2022214931 B2 | 11/2024 |
| AU | 2023206091 B2 | 11/2024 |
| AU | 2022211325 B2 | 12/2024 |
| AU | 2024201431 B2 | 5/2025 |
| CA | 3063569 A1 | 11/2018 |
| CA | 3209081 A1 | 8/2022 |
| CA | 3211071 A1 | 9/2022 |
| CH | 701397 | 1/2011 |
| CN | 2423872 | 3/2001 |
| CN | 204863450 U | 12/2015 |
| CN | 109070324 A | 12/2018 |
| CN | 108602180 B | 12/2022 |
| CN | 116801840 A | 9/2023 |
| CN | 117414174 A | 1/2024 |
| DE | 102010017726 A1 | 1/2011 |
| EP | 0290375 A1 | 11/1988 |
| EP | 0745460 A1 | 12/1996 |
| EP | 4427685 A1 | 9/2024 |
| EP | 4243715 B1 | 4/2025 |
| FR | 2054809 A5 | 5/1971 |
| JP | S6018188 U | 2/1985 |
| JP | H06229427 A | 8/1994 |
| JP | H06304193 | 11/1994 |
| JP | H10174689 A | 6/1998 |
| JP | 2002144255 A | 5/2002 |
| JP | 2004159741 A | 6/2004 |
| JP | 2005506211 A | 3/2005 |
| JP | 2006231511 A | 9/2006 |
| JP | 2010524577 A | 7/2010 |
| JP | 2012504987 A | 3/2012 |
| JP | 2013036488 A | 2/2013 |
| JP | 2015517341 A | 6/2015 |
| JP | 2016202560 A | 12/2016 |
| JP | 2017024167 | 2/2017 |
| JP | 2018502689 A | 2/2018 |
| JP | 2019022663 A | 2/2019 |
| JP | 2019524165 A | 9/2019 |
| JP | 2019177138 A | 10/2019 |
| JP | 2019198645 A | 11/2019 |
| JP | 2020521560 | 7/2020 |
| JP | 2020530332 A | 10/2020 |
| JP | 2020185421 A | 11/2020 |
| JP | 7127068 B2 | 8/2022 |
| JP | 2022166207 A | 11/2022 |
| JP | 7366968 B2 | 10/2023 |
| JP | 7375104 B2 | 10/2023 |
| JP | 7404463 B2 | 12/2023 |
| JP | 2023551117 A | 12/2023 |
| JP | 2024013234 A | 1/2024 |
| JP | 2024504977 A | 2/2024 |
| JP | 2024505231 A | 2/2024 |
| JP | 2024505239 A | 2/2024 |
| JP | 2024505543 A | 2/2024 |
| JP | 2024507954 A | 2/2024 |
| JP | 2024126020 A | 9/2024 |
| JP | 7571213 B2 | 10/2024 |
| JP | 7592184 B2 | 11/2024 |
| JP | 7599016 B2 | 12/2024 |
| JP | 7602052 B2 | 12/2024 |
| JP | 2024180472 A | 12/2024 |
| JP | 2025026539 A | 2/2025 |
| JP | 7676565 B2 | 5/2025 |
| JP | 7678117 B2 | 5/2025 |
| JP | 7680548 B2 | 5/2025 |
| WO | WO-8802246 A2 | 4/1988 |
| WO | WO-8906516 A1 | 7/1989 |
| WO | WO-2008130904 A2 | 10/2008 |
| WO | WO-2016112397 A1 | 7/2016 |
| WO | WO-2018044348 A1 | 3/2018 |
| WO | WO-2018217250 A1 | 11/2018 |
| WO | WO-2022103835 A1 | 5/2022 |
| WO | WO-2022159704 A1 | 7/2022 |
| WO | WO-2022165215 A1 | 8/2022 |
| WO | WO-2022165223 A1 | 8/2022 |
| WO | WO-2022165357 A1 | 8/2022 |
| WO | WO-2022182772 A1 | 9/2022 |

OTHER PUBLICATIONS

"Australian Application Serial No. 2021378282, Response filed May 22, 2024 to First Examination Report mailed Mar. 7, 2024", 8 pgs.

"Australian Application Serial No. 2022211325, First Examination Report mailed Apr. 29, 2024", 3 pgs.

"Australian Application Serial No. 2022211325, Response filed Jul. 19, 2024 to First Examination Report mailed Apr. 29, 2024", 17 pgs.

"Australian Application Serial No. 2022212126, First Examination Report mailed Apr. 26, 2024", 3 pgs.

"Australian Application Serial No. 2022212126, Response Filed Jul. 2, 2024 to First Examination Report mailed Apr. 26, 2024", 16 pgs.

"Australian Application Serial No. 2022212275, First Examination Report mailed May 15, 2024", 2 pgs.

"Australian Application Serial No. 2022212275, Response Filed Jun. 19, 2024 to First Examination Report mailed May 15, 2024", 14 pgs.

"Australian Application Serial No. 2022214931, First Examination Report mailed May 7, 2024", 3 pgs.

"Australian Application Serial No. 2022214931, Response filed Jul. 26, 2024 to First Examination Report mailed May 7, 2024", 9 pgs.

"Australian Application Serial No. 2022227599, First Examination Report mailed Apr. 18, 2024", 2 pgs.

"Australian Application Serial No. 2022227599, Response Filed Sep. 27, 2024 to First Examination Report mailed Apr. 18, 2024", 14 pgs.

"Australian Application Serial No. 2023206091, First Examination Report mailed Apr. 19, 2024", 4 pgs.

"Australian Application Serial No. 2023206091, Response filed Jul. 5, 2024 to First Examination Report mailed Apr. 19, 2024", 13 pgs.

"European Application Serial No. 22703776.9, Response Filed Mar. 11, 2024 to Communication pursuant to Rules 161(1) and 162 EPC mailed Aug. 30, 2023", 9 pgs.

"European Application Serial No. 22704684.4, Response filed Mar. 18, 2024 to Communication pursuant to Rules 161(1) and 162 EPC mailed Sep. 7, 2023", 17 pgs.

"European Application Serial No. 22705238.8, Response Filed Mar. 18, 2024 to Communication pursuant to Rules 161(1) and 162 EPC mailed Sep. 8, 2023", 172 pgs.

"European Application Serial No. 22705250.3, Response Filed Mar. 18, 2024 to Communication pursuant to Rules 161(1) and 162 EPC mailed Sep. 8, 2023", 15 pgs.

"European Application Serial No. 22713111.7, Response Filed Apr. 15, 2024 to Communication pursuant to Rules 161(1) and 162 EPC mailed Oct. 4, 2024", 8 pgs.

"European Application Serial No. 24161610.1, Extended European Search Report mailed Jul. 10, 2024", 6 pgs.

"Japanese Application Serial No. 2023-117628, Notification of Reasons for Refusal mailed May 28, 2024", w/ English translation, 7 pgs.

"Japanese Application Serial No. 2023-527766, Notification of Reasons for Refusal mailed Apr. 16, 2024", w/ English translation, 6 pgs.

"Japanese Application Serial No. 2023-544157, Notice of Reasons for Rejection mailed Apr. 23, 2024", w/ English translation, 5 pgs.

"Japanese Application Serial No. 2023-546065, Notification of Reasons for Refusal mailed Apr. 16, 2024", w/ English Translation, 15 pgs.

"Japanese Application Serial No. 2023-546135, Notification of Reasons for Refusal mailed Apr. 16, 2024", w/ English Translation, 9 pgs.

(56) References Cited

OTHER PUBLICATIONS

"Japanese Application Serial No. 2023-546333, Notification of Reasons for Refusal mailed Apr. 16, 2024", w/ English translation, 8 pgs.

"Japanese Application Serial No. 2023-552050, Notification of Reasons for Rejection mailed Jul. 2, 2024", W/English Translation, 5 pgs.

U.S. Appl. No. 17/523,540, filed Nov. 10, 2021, Bi-Spring Surgical Impact Tool.

U.S. Appl. No. 17/587,794, filed Jan. 28, 2022, Rotary Electric Surgical Hammer Impact Tool.

U.S. Appl. No. 17/587,866, filed Jan. 28, 2022, Orthopedic Impactor Tool.

U.S. Appl. No. 17/589,456, filed Jan. 31, 2022, Tri-Roll Thread Electric Surgical Impact Tool.

U.S. Appl. No. 17/678,807, filed Feb. 23, 2022, Bi-Spring Surigical Hammer Impact Tools.

"U.S. Appl. No. 17/589,456, Ex Parte Quayle Action mailed Sep. 5, 2024", 10 pgs.

"Canadian Application Serial No. 3,200,838, Examiners Rule 86(2) Report mailed Aug. 21, 2024", 4 pgs.

"Japanese Application Serial No. 2023-117628, Response Filed Aug. 23, 2024 to Notification of Reasons for Refusal mailed May 28, 2024", W/ English Claims, 11 pgs.

"Japanese Application Serial No. 2023-527766, Notification of Reasons for Refusal mailed Jul. 30, 2024", w/ English Translation, 8 pgs.

"Japanese Application Serial No. 2023-527766, Response filed Jul. 11, 2024 to Notification of Reasons for Refusal mailed Apr. 16, 2024", W/ English Claims, 13 pgs.

U.S. Appl. No. 18/222,830, filed Jul. 17, 2023, Linear Electric Surgical Hammer Impact Tool.

"U.S. Appl. No. 17/587,794, Notice of Allowance mailed Nov. 15, 2023", 10 pgs.

"U.S. Appl. No. 17/587,866, Notice of Allowance mailed Apr. 11, 2024", 17 pgs.

"U.S. Appl. No. 17/678,807, Notice of Allowance mailed Feb. 14, 2024", 16 pgs.

"Australian Application Serial No. 2021378282, First Examination Report mailed Mar. 7, 2024", 3 pgs.

"European Application Serial No. 21820393.3, Response Filed Dec. 14, 2023 to Communication pursuant to Rules 161(1) and 162 EPC mailed Jul. 6, 2023", 10 pgs.

"European Application Serial No. 23186404.2, Extended European Search Report mailed Nov. 23, 2023", 8 pgs.

"Japanese Application Serial No. 2023-552050, Resoponse Filed Sep. 24, 2024 to Notification of Reasons for Rejection mailed Jul. 2, 2024", W English Claims, 11 pgs.

"U.S. Appl. No. 17/589,456, Response filed Oct. 28, 2024 to Ex Parte Quayle Action mailed Sep. 5, 2024", 11 pgs.

"Japanese Application Serial No. 2023-527766, Response filed Oct. 29, 2024 to Notification of Reasons for Refusal mailed Jul. 30, 2024", W English Claims, 13 pgs.

"Japanese Application Serial No. 2023-544157, Response Filed Jul. 19, 2024 to Notice of Reasons for Rejection mailed Apr. 23, 2024", W English Claims, 13 pgs.

"U.S. Appl. No. 17/587,794, Response filed Aug. 28, 2023 to Restriction Requirement mailed Jun. 27, 2023", 7 pgs.

"U.S. Appl. No. 17/587,794, Restriction Requirement mailed Jun. 27, 2023", 7 pgs.

"International Application Serial No. PCT/US2021/058776, International Preliminary Report on Patentability mailed May 25, 2023", 10 pgs.

"International Application Serial No. PCT/US2022/013312, International Preliminary Report on Patentability mailed Aug. 3, 2023", 12 pgs.

"International Application Serial No. PCT/US2022/014368, International Preliminary Report on Patentability mailed Aug. 10, 2023", 10 pgs.

"International Application Serial No. PCT/US2022/014380, International Preliminary Report on Patentability mailed Aug. 10, 2023", 9 pgs.

"International Application Serial No. PCT/US2022/014596, International Preliminary Report on Patentability mailed Aug. 10, 2023", 7 pgs.

"International Application Serial No. PCT/US2022/017537, International Preliminary Report on Patentability mailed Sep. 7, 2023", 7 pgs.

"International Application Serial No. PCT/US2022/013312, Invitation to Pay Additional Fees mailed May 3, 2022", 5 pgs.

"International Application Serial No. PCT/US2021/058776, International Search Report mailed Feb. 9, 2022", 5 pgs.

"International Application Serial No. PCT/US2021/058776, Written Opinion mailed Feb. 9, 2022", 8 pgs.

"International Application Serial No. PCT/US2022/013312, International Search Report mailed Jun. 24, 2022", 6 pgs.

"International Application Serial No. PCT/US2022/013312, Written Opinion mailed Jun. 24, 2022", 10 pgs.

"International Application Serial No. PCT/US2022/014368, International Search Report mailed May 30, 2022", 7 pgs.

"International Application Serial No. PCT/US2022/014368, Invitation to Pay Additional Fees mailed Apr. 5, 2022", 10 pgs.

"International Application Serial No. PCT/US2022/014368, Written Opinion mailed May 30, 2022", 8 pgs.

"International Application Serial No. PCT/US2022/014380, International Search Report mailed Jun. 24, 2022", 6 pgs.

"International Application Serial No. PCT/US2022/014380, Invitation to Pay Additional Fees mailed May 3, 2022", 5 pgs.

"International Application Serial No. PCT/US2022/014380, Written Opinion mailed Jun. 24, 2022", 7 pgs.

"International Application Serial No. PCT/US2022/014596, International Search Report mailed May 10, 2022", 4 pgs.

"International Application Serial No. PCT/US2022/014596, Written Opinion mailed May 10, 2022". 5 pgs.

"International Application Serial No. PCT/US2022/017537, International Search Report mailed Jun. 1, 2022", 4 pgs.

"International Application Serial No. PCT/US2022/017537, Written Opinion mailed Jun. 1, 2022", 5 pgs.

Budimir, Miles, "What is a rack and roller pinion?", [Online]. Retrieved from the Internet: <https://www.motioncontroltips.com/rack-roller-pinion/>, (Nov. 10, 2017), 13 pgs.

Nexen, "Rack and Roller Pinion System", [Online]. Retrieved from the Internet: <https://www.nexengroup.com/nxn/products/prod-nav/lp/Roller+Pinion+System>, (Accessed online Apr. 27, 2021), 10 pgs.

"U.S. Appl. No. 17/589,456, Corrected Notice of Allowability malled Nov. 27, 2024", 2 pgs.

"Canadian Application Serial No. 3,206,984, Response filed Mar. 17, 2025 to Examiners Rule 86(2) Requisition malled Nov. 21, 2024", 15 pgs.

"U.S. Appl. No. 17/589,456, Corrected Notice of Allowability mailed Nov. 27, 2024", 2 pgs.

"U.S. Appl. No. 17/589,456, Notice of Allowance mailed Nov. 14, 2024", 7 pgs.

"U.S. Appl. No. 18/222,830, Notice of Allowance mailed Apr. 23, 2025", 11 pgs.

"Australian Application Serial No. 2024201431, First Examination Report mailed Oct. 29, 2024", 3 pgs.

"Australian Application Serial No. 2024201431, Response filed Jan. 9, 2025 to First Examination Report mailed Oct. 29, 2024", 16 pgs.

"Canadian Application Serial No. 3,200,838, Response filed Dec. 10, 2024 to Examiners Rule 86(2) Report mailed Aug. 21, 2024", 22 pgs.

"Canadian Application Serial No. 3,206,984, Examiners Rule 86(2) Requisition mailed Nov. 21, 2024", 6 pgs.

"Canadian Application Serial No. 3,206,984, Response filed Mar. 17, 2025 to Examiners Rule 86(2) Requisition mailed Nov. 21, 2024", 15 pgs.

"Canadian Application Serial No. 3,206,985, Examiners Rule 86(2) Report mailed Nov. 21, 2024", 6 pgs.

(56) References Cited

OTHER PUBLICATIONS

"Canadian Application Serial No. 3,206,985, Response Filed Mar. 14, 2025 to Examiners Rule 86(2) Report mailed Nov. 21, 2024", 16 pgs.
"Canadian Application Serial No. 3,207,039, Examiners Rule 86(2) Report mailed Nov. 22, 2024", 5 pgs.
"Canadian Application Serial No. 3,207,039, Response Filed Mar. 17, 2025 to Examiners Rule 86(2) Report mailed Nov. 22, 2024", 13 pgs.
"Canadian Application Serial No. 3,208,984, Examiners Rule 86(2) Report mailed Nov. 22, 2024", 5 pgs.
"Canadian Application Serial No. 3,208,984, Response filed Mar. 20, 2025 to Examiners Rule 86(2) Report mailed Nov. 22, 2024", 13 pgs.
"Canadian Application Serial No. 3,209,081, Examiners Rule 86(2) Report mailed Nov. 22, 2024", 4 pgs.
"Canadian Application Serial No. 3,209,081, Response filed Mar. 17, 2025 to Examiners Rule 86(2) Report mailed Nov. 22, 2024", 20 pgs.
"Canadian Application Serial No. 3,211,071, Office Action mailed Jan. 28, 2025", 6 pgs.
"Canadian Application Serial No. 3,211,071, Response filed May 22, 2025 to Office Action mailed Jan. 28, 2025", w/ English Claims, 9 pgs.
"European Application Serial No. 24161610.1, Response filed Feb. 27, 2025 to Extended European Search Report mailed Jul. 10, 2024", 15 pgs.
"Japanese Application Serial No. 2023-546065, Notification of Reasons for Rejection mailed Oct. 22, 2024", W/English Translation, 4 pgs.
"Japanese Application Serial No. 2023-546065, Response filed Jan. 20, 2025 to Notification of Reasons for Rejection mailed Oct. 22, 2024", W/ English Claims, 7 pgs.
"Japanese Application Serial No. 2023-546065, Response filed Jul. 12, 2024 to Notification of Reasons for Refusal mailed Apr. 16, 2024", W/ English Claims, 10 pgs.
"Japanese Application Serial No. 2023-546135, Final Notification of Reasons for Refusal mailed Oct. 22, 2024", w/ English translation, 5 pgs.
"Japanese Application Serial No. 2023-546135, Response filed Jan. 16, 2025 to Final Notification of Reasons for Refusal mailed Oct. 22, 2024", W/ English Claims, 7 pgs.
"Japanese Application Serial No. 2023-546135, Response filed Jul. 12, 2024 to Notification of Reasons for Refusal mailed Apr. 16, 2024", W/ English Claims, 10 pgs.
"Japanese Application Serial No. 2023-546333, Notification of Reasons for Rejection mailed Oct. 22, 2024", w/ English translation, 6 pgs.
"Japanese Application Serial No. 2023-546333, Response filed Jan. 20, 2025 to Notification of Reasons for Rejection mailed Oct. 22, 2024", W/ English Claims, 10 pgs.
"Japanese Application Serial No. 2023-546333, Response filed Jul. 12, 2024 to Notification of Reasons for Refusal mailed Apr. 16, 2024", W/ English Claims, 12 pgs.
"Japanese Application Serial No. 2024-033694, Notification of Reasons for Rejection mailed Feb. 4, 2025", W/English Translation, 12 pgs.
"Japanese Application Serial No. 2024-033694, Response Filed May 1, 2025 to Notification of Reasons for Rejection mailed Feb. 4, 2025", W/ English Claims, 18 pgs.

* cited by examiner

LINEAR ELECTRIC SURGICAL HAMMER IMPACT TOOL

PRIORITY CLAM

The present application claims priority to U.S. Provisional Application No. 63/140,071, entitled "Linear Electric Hammer Impact Tool," filed on Jan. 21, 2021; the contents of which are hereby incorporated by reference in their entirety.

FIELD OF THE DISCLOSURE

The present disclosure relates generally to surgical instruments and use thereof. More specifically, the present disclosure relates to an electric surgical impact tool and methods of use thereof.

BACKGROUND

Orthopedic surgeons commonly utilize tools for cutting or carving bone that require a hammer or mallet to transmit an impaction force to the tool. An example is a broach tool used to prepare the proximal end of a femur to receive the stem of a hip implant. Such broaches can be used with a hammer wielded by the physician or with a pneumatic "jackhammer" like tool. However, striking a broach tool with a hammer can be tiresome and can cause high stresses on the physician's own joints, such as the shoulder joint. Furthermore, pneumatic impact tools require connection to an air hose, which can he inconvenient and can potentially limit the physician's ability to orient the tool in the desired manner.

SUMMARY

The following, non-limiting examples, detail certain aspects of the present subject matter to solve the challenges and provide the benefits discussed herein, among others.

Example 1 is a linear electric surgical hammer impact tool comprising: a housing defining a cavity extending along a longitudinal axis of the housing; a slider located inside the cavity and arranged along the longitudinal axis of the housing; a shuttle located inside the cavity and arranged along the longitudinal axis of the housing, the shuttle comprising a first set of collars and a second set of collars; a motor configured to drive the slider along the longitudinal axis in a first direction and a second direction; and a tool holder connected to the shuttle, wherein motion of the slider in the first direction causes the slider to contact the first set of collars and motion of the slider in the second direction causes the slider to contact the second set of collars.

In Example 2, the subject matter of Example I optionally includes Wherein the slider comprises a slider flange that contacts the first and second set of collars during motion of the slider.

In Example 3, the subject matter of any one or more of Examples 1-2 optionally include wherein the motor is a tube motor and a slider shaft passes at least partially through the tube motor.

In Example 4, the subject matter of any one or more of Examples 1-3 optionally include wherein the shuttle comprises: a shuttle flange; a first rod extending from the shuttle flange, a first collar from the first and second set of collars attached to the first rod; and a second rod extending from the shuttle flange a second collar from the first and second set of collars attached to the second rod.

In Example 5, the subject matter of any one or more of Examples 1-4 optionally include wherein the shuttle comprises a biasing element configured to bias the shuttle in the first direction.

In Example 6, the subject matter of any one or more of Examples 1-5 optionally include a sensor arrange to detect a position of the slider within the cavity.

In Example 7, the subject matter of any one or more of Examples 1-6 optionally include a controller operative to perform operations comprising: determining an estimate of a hone quality; and increasing or decreasing an impact force generated by the linear electric surgical hammer impact tool based on the estimate of the bone quality.

In Example 8, the subject matter of any one or more of Examples 1-7 optionally include a controller operative to perform operations comprising: determining a displacement of a tool attached to the tool holder; and increasing or decreasing an impact force generated by the linear electric surgical hammer impact tool based on the displacement of the tool.

In Example 9, the subject matter of any one or more of Examples 1-8 optionally include a handle that defines a cavity sized to receive electronics and the motor.

In Example 10, the subject matter of Example 9 optionally includes wherein the handle comprises: a first trigger operative to cause the slider to move in the first direction; and a second trigger operative to cause the slider to move in the second direction.

Example 11 is a linear electric surgical hammer impact tool comprising: a housing defining a cavity extending along a longitudinal axis of the housing; a slider comprising a slider shaft located inside the cavity and arranged along the longitudinal axis of the housing; a shuttle located inside the cavity and arranged along the longitudinal axis of the housing, the shuttle comprising: a shuttle flange, a first rod extending from the shuttle flange, a first collar and a second collar attached to the first rod, and a second rod extending from the shuttle flange, a third collar and a fourth collar attached to the second rod, the first collar, the second collar, the third collar, and the fourth collar defining a stroke of the slider; a tube motor defining a through hole sized to receive the slider shaft, the tube motor configured to drive the slider along the longitudinal axis in a first direction and a second direction; and a tool holder connected to the shuttle, wherein motion of the slider in the first direction causes the slider to contact the first collar and the third collar and motion of the slider in the second direction causes the slider to contact the second collar and the fourth collar.

In Example 12, the subject matter of Example 11 optionally includes wherein the shuttle comprises a biasing element configured to bias the shuttle in the first direction.

in Example 13, the subject matter of any one or more of Examples 11-12 optionally include a sensor arrange to detect a position of the slider within the housing, In Example 14, the subject matter of any one or more of Examples 11-13 optionally include a controller operative to perform operations comprising: determining an estimate of a bone quality; and increasing or decreasing an impact force generated by the linear electric surgical hammer impact tool based on the estimate of the bone quality.

in Example 15, the subject matter of any one or more of Examples 11-14 optionally include a controller operative to perform operations comprising: determining a displacement of a tool attached to the tool holder; and increasing or decreasing an impact force generated by the linear electric surgical hammer impact tool based on the displacement of the tool.

In Example 16, the subject matter of any one or more of Examples 11-15 optionally include a handle that defines a cavity sized to receive electronics and the motor; a first trigger operative to cause the slider to move in the first direction; and a second trigger operative to cause the slider to move in the second direction.

Example 17 is a linear electric surgical hammer impact tool comprising: a processor; and a memory storing instructions that, when executed by the processor, cause the processor to perform operations comprising: receiving an estimate of a bone quality, receiving feedback during a surgical procedure, determining an updated estimate of the bone quality, and increasing or decreasing an impact force generated by the linear electric surgical hammer impact tool based on the updated estimate of the bone quality.

In Example 18, the subject matter of Example 17 optionally includes wherein determining the updated estimate of the bone quality includes determining a displacement of a tool attached to a tool holder of the linear electric surgical hammer impact tool.

In Example 19, the subject matter of any one or more of Examples 17-18 optionally include wherein receiving the estimate of the bone quality include receiving patient data related to a bone to be rasped.

In Example 20, the subject matter of any one or more of Examples 17-19 optionally include a Hall effect sensor, wherein the operations further comprise determining a position of a slider located within a housing of the linear electric surgical hammer impact tool based on a signal received from the Flail effect sensor.

in Example 21, the surgical impact tools, systems, and/or methods of any one or any combination of Examples 1-20 can optionally be configured such that all elements or options recited are available to use or select from.

BRIEF DESCRIPTION OF THE FIGURES

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

As an alternative to a pneumatic piston driven system, disclosed herein are electrically driven systems. Specifically, the linear electric surgical hammer impact tools disclosed herein can include impact elements, sometimes called sliders that can impact shuttles, tool holding elements, etc. to generate impact forces.

An electric motor can be configured to drive the impact elements to create the impact forces. For example, motion of a slider in a first direction can cause the slider to contact a first set of collars and motion of the slider in a second direction can cause the slider to contact a second set of collars. The contact between the collars and the slider can generate the impact forces to drive a rasp and/or broach into a canal of a bone and extract the rasp and/or broach from the canal.

As disclosed herein, one or more sensors, such as Hall effect sensors can be used to determine the position of the impact elements within the linear electric surgical hammer impact tools. Based on the position, the impact force generated can be determined. Also, a controller can be operative to determining an estimate of a bone quality and increasing or decreasing an impact force generated by the linear electric surgical hammer impact tool based on the estimate of the bone quality.

The above discussion is intended to provide an overview of subject matter of the present patent application. It is not intended to provide an exclusive or exhaustive explanation of the invention. The description below is included to provide further information about the present patent application.

Figure 1:
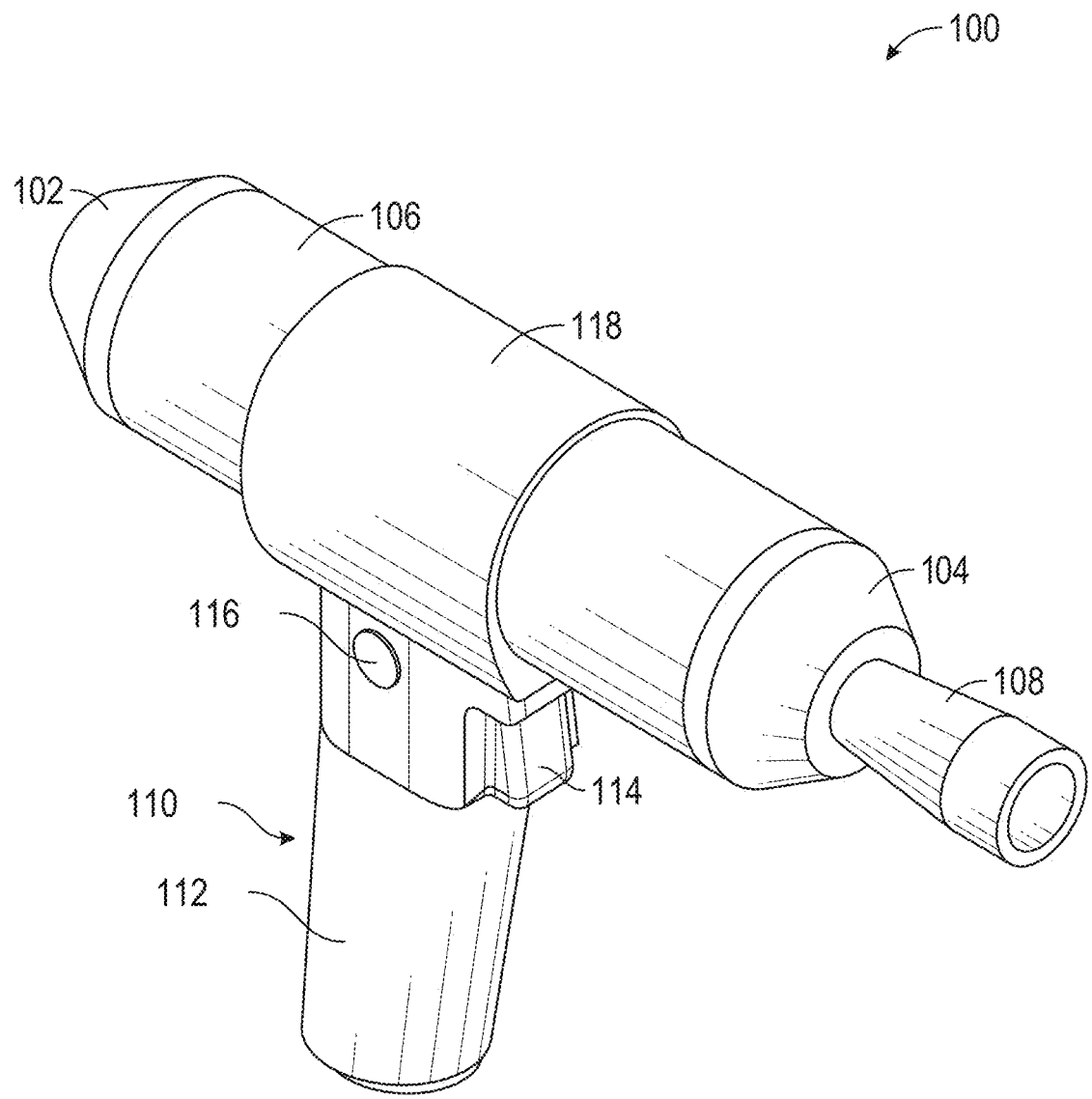
FIG. 1 shows an isometric view of a linear electric surgical hammer impact tool consistent with at least one example of this disclosure.
Figure 2:
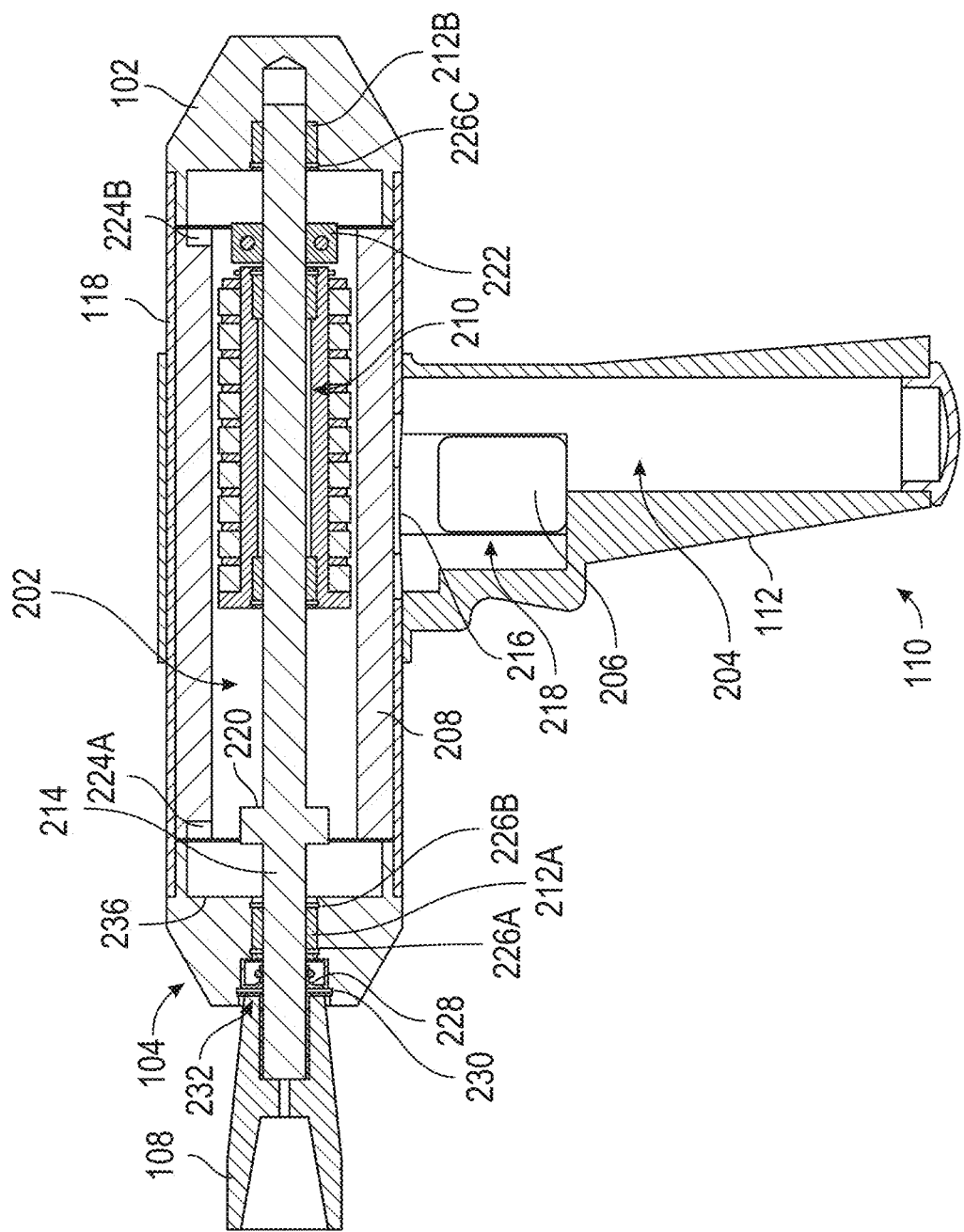
FIG. 2 shows a side section view of a linear electric surgical hammer impact tool consistent with at least one example of this disclosure.

Turning now to the figures, FIG. 1 shows an example of a linear electric surgical hammer impact tool 100 consistent with at least one example of this disclosure. As disclosed herein, linear electric surgical hammer impact tool 100 can provide a simple, efficient, and robust battery powered handheld linear electric surgical hammer impact tool for use in surgical procedures. The linear electric surgical hammer impact tool 100 can include a distal end cap 102 and a proximal end cap 104 on opposite ends of a tool body 106. As shown in FIG. 2, a tool holding element 202 with tool holder 108 emanates from the proximal end of the tool body 106. With continued reference to FIG. 1, a handle 110 is secured to the tool body 106 and has a grip portion 112 which internally contains a battery pack 204 and controller 206, sometimes called control electronics, controlled by a trigger 114. Alternatively, or in addition, a voice control and response is enabled with use of a speaker/microphone 116.

FIGS. 2, 3, 4A, 4B, 4C, 4D, and 5 show internal details of the linear electric surgical hammer impact tool 100 where tool body 106 contains a tubular electromagnetic linear motor with a coil structure 208 fixed inside the tool body 106. The coil structure 208 actuates a magnetic or ferromagnetic mechanical impact motion element 210. The impact motion element 210 may be supported by low friction bearings 502A and 502B (collectively bearings 502 shown in FIG. 5) on a centrally located rod-like tool holder element 202 which is supported by low friction bearings 212A and 212B (collectively bearings 212 shown in FIG. 2) in the proximal end cap 104 and distal end cap 102 respectively located at the ends of the tool body 106. These bearings 212 and 502 may be simple plain bushing type bearings made from a material such as Rulon, which has a low coefficient of friction against polished stainless steel of the shaft 214, and since the radial loads are very low, essentially radial parasitic magnetic forces from the motor, the energy loss due to friction will be less than a few percent of the energy delivered to the impact surface. If, however, longer life, less particles, and lower friction is desired, since the speeds are high, several meters per second, self-acting aerodynamic bearing features can be formed in the bearings' inside diameters that act in either direction of motion. Furthermore, because a user may exert large radial loads on the tool when working on certain types of patients, and hence on the tool holder, the bearing 212A can be a rolling element type such as a ball bearing cage bushing a die set bushing) bearing or a recirculating ball bushing, or as discussed below in the context of FIGS. 4B, 4C and 4D, a diaphragm flexure type bearing.

The coil structure 208 can contain sensing elements 216 to determine a position of the impact motion element 210. The sensed position can be used by the controller 206, disposed in region 218, to control current from the battery pack 204 to the coil structure 208 to thus control a position, a velocity, and an acceleration of the impact motion element 210. The impact motion element 210 can thus be controlled to deliver the desired impact energy to a flange 220 of the tool holder element 202 with a desired cycle time. Accordingly, the impact motion element 210 can cause a force on a tool, held by the tool holder element 202 and tool holder 108, to be able to do useful work such as cutting bone, where the mass of the impact motion element 210 on the low end may be about ¼ of the mass of the tool holder element 202 and the attached tooling (e.g., a chuck, tool adapter, tool holder 108, etc.) and up to about two to four times that of the tool holder element 202 and attached tooling.

FIG. 2 shows a side section view of the linear electric surgical hammer impact tool 100 in the ready to be activated position where the coil structure 208 have caused the impact motion element 210 to move until it almost touches a rear impact flange 222, sometimes called a distal flange, used for retracting the tool. Here the rear impact flange 222 is of the bolt-on collar type to enable assembly of the system, but it could also be shrunk fit on once the impact motion element 210 is placed over the shaft 214. The user can push a tool (not shown), such as a broach attached to tool holder 108, forward into the object to be cut, which can push the tool holder element 202 backwards into the tool body 106. The flange 220 of the tool holder element 202 is now located at a proper impact position and its position is sensed by a sensor 224A. The rear impact flange 222 position is sensed by sensor 224B. Sensor 224A and sensor 224B are collectively referred to as sensors 224.

Figure 3:
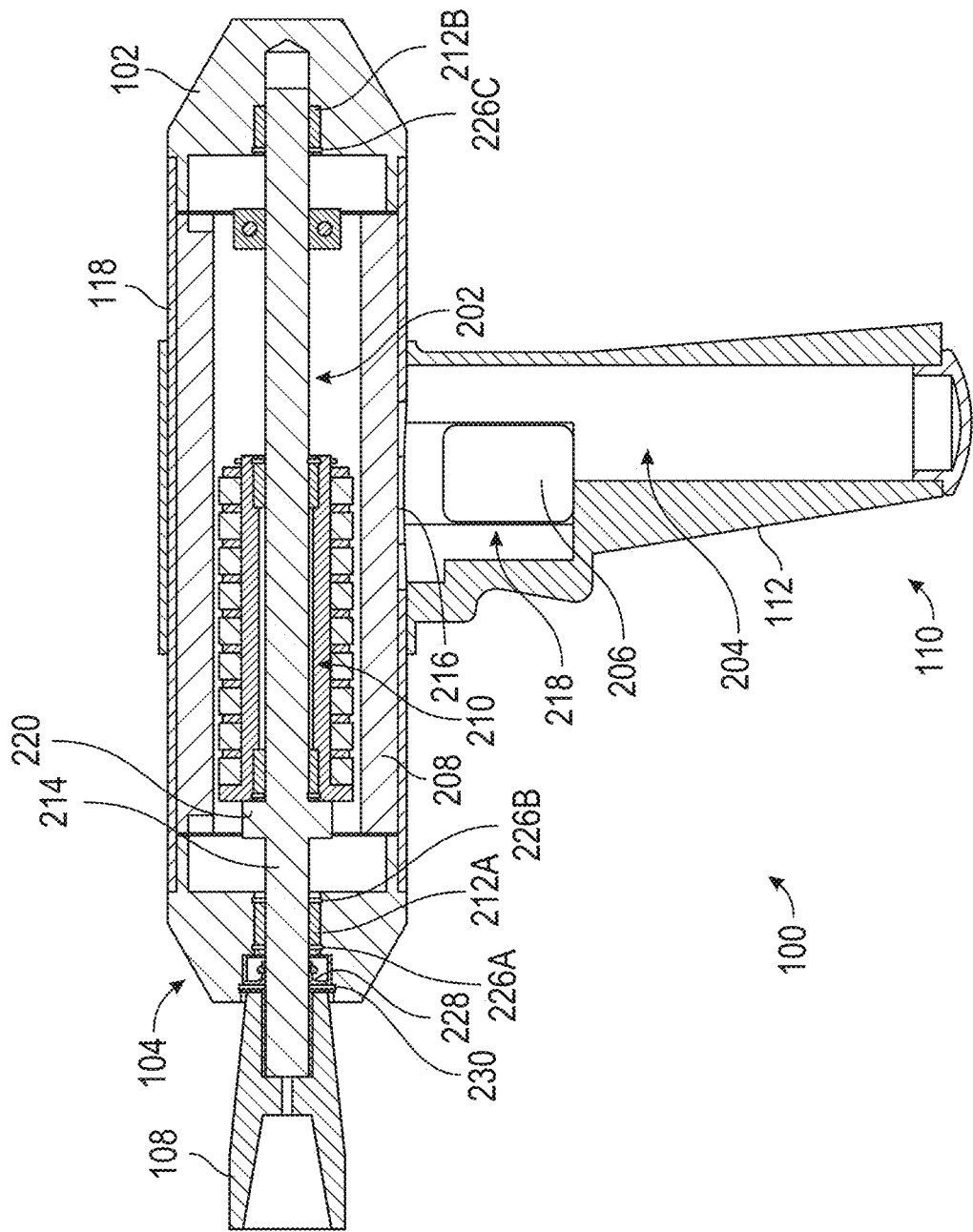
FIG. 3 shows a side section cutaway view of a linear electric surgical hammer impact tool consistent with at least one example of this disclosure.

The position of the impact motion element 210 may also be sensed, such as with sensing element 216, such as a magnetic sensor, in the coil structure 208. Based on the energy to be delivered, the controller 206 can command current (and voltage) to the coil structure 208 to accelerate the impact motion element 210 forward to reach a velocity needed, in the space that has been sensed, in order to deliver an impact of the desired energy. FIG. 3 shows a side section cutaway view of the linear electric surgical hammer impact tool 100 at the moment of impact between the impact motion element 210 and the flange 220.

Simplicity of design can be achieved by minimizing the number of parts and moving interfaces. As disclosed herein, concentric elements can enable minimal energy loss and wear of moving elements. The tool holder element 202 can rest in linear bearings 212, which may be sliding bearings or rolling element bearings or flexural bearings, at the proximal and distal ends respectively. Rulon, a PTFE based bearing, is an example sliding contact beating material because it can be steam sterilized and has very low friction even when not additionally lubricated. Each of the bearings 212 can be press-fit into their respective end caps 102 and 104, but here snap rings 226 (labeled individually as snap rings 226A, 226B, and 226C) are shown to provide additional reliability for holding the bearings 212 in place in this impact device. In addition, a lip seal 228 can be held in place by a snap ring 230. Alternatively, the lip seal 228 and snap ring 230 can be replaced by a simple O-ring or a Quad-ring in a groove where the lip seal 228 resides. The lip seal 228 can have lower friction, but it can be more complex to clean out. Still consistent with embodiments disclosed herein, a bellows seal can be used that can allow for effectively unrestrained axial motion, or a metal bellows can provide a slight spring bias, while providing a hermetic seal. A bellows, advantageously for sterilization purposes, can allow gas inside the tool to expand and push out as needed the tool holder element 202 by deflecting the bellows. The distal end bearing and mating shaft segment may be hexagonal to prevent rotation of the tool holding element 202, and the hexagonal bearing in the enclosed distal end of the tool does not need to be seated.

Figure 4A:
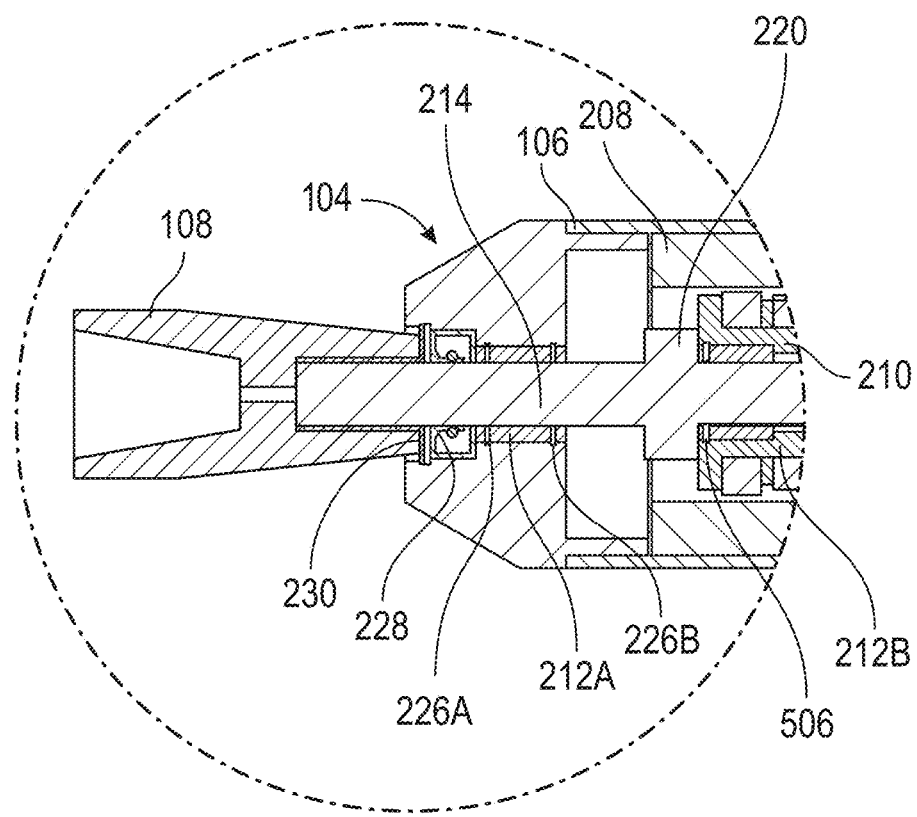
FIG. 4A shows a detail side section view of a linear electric surgical hammer impact tool consistent with at least one example of this disclosure.
Figure 4B:
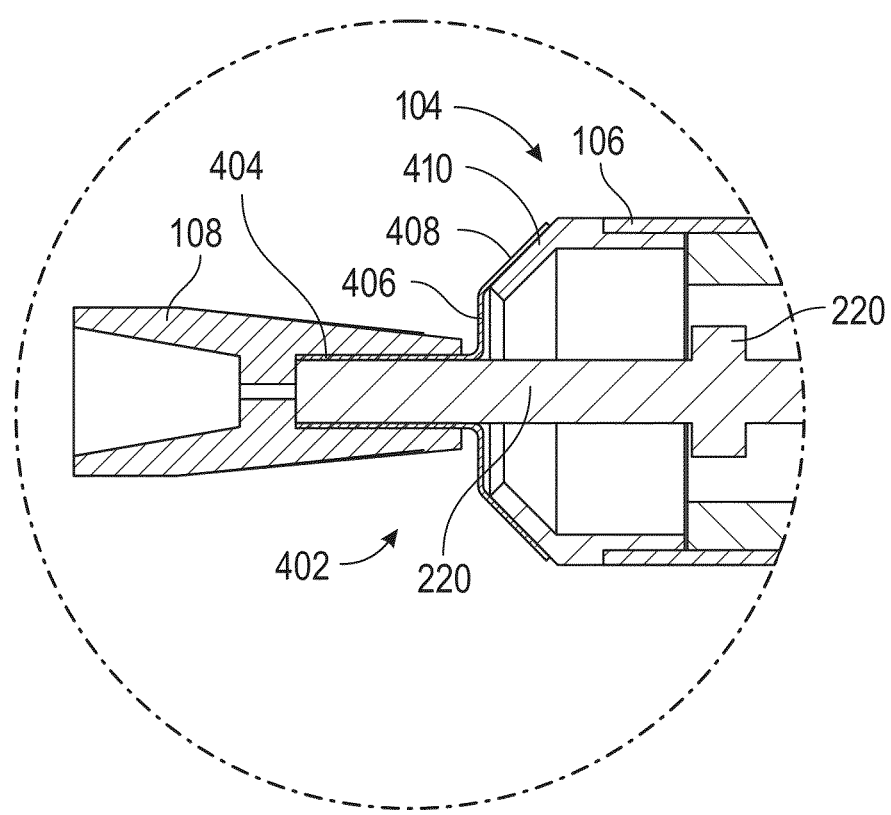
FIG. 4B shows a detail side section view of a linear electric surgical hammer impact tool consistent with at least one example of this disclosure.

FIG. 4B shows where the proximal bearing 212A can be replaced with diaphragm flexure bearing 402 that can provide sealing by the diaphragm at the proximal end as well as internal expansion of gases. Other elements can remain the same as described with respect to FIGS. 4A, 4C, and 4D. The diaphragm flexures bearings 402 can be made from electroformed nickel alloy, for example, so it can also provide a nominal spring return force to the tool holder element 202 to keep it centered. The distal bearing 212B can remain as a sliding bearing or it can also be made from a similar flexural bearing.

The impact flanges 220 and 222 can be centered about the coil structure 208, and their positions may be sensed by sensors 224, so the proper motion profile of the impact motion element 210 can be controlled to impact the tool holder element 202 to either drive in or retract a tool. As shown, the tool holder 108 can fit over the front cylindrical portion 404 of the diaphragm flexure bearings 402. This can be a shrink-fit or it may be bonded with an adhesive, such as Loctite. A flexing element 406 can be the actual flexing diaphragm, which can also provide radial stiffness to support the tool holder element 202 shaft 214. A conical portion 408 of the diaphragm flexure bearings 402 can fit over a front tapered portion 410 of the proximal end cap 104 and can act to center the shaft 214 with respect to the proximal end cap 104 and the coils.

Figure 4C:
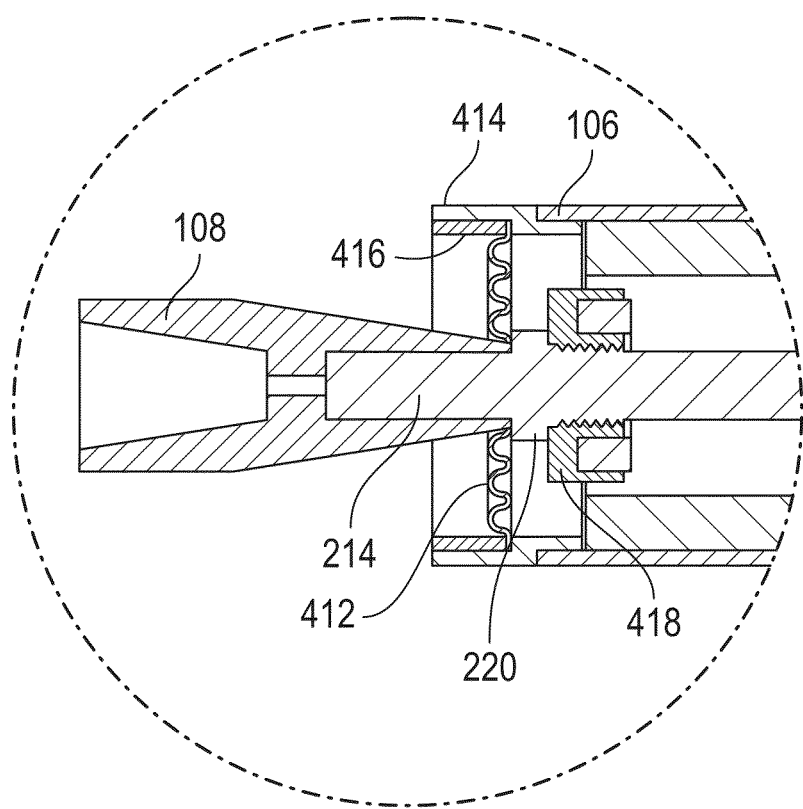
FIG. 4C shows a detail side section view of a linear electric surgical hammer impact tool consistent with at least one example of this disclosure.

FIG. 4B shows a simple diaphragm flexure 412 but it is understood that a convoluted (or corrugated) diaphragm based proximal end cap can also be used, as shown in FIG. 4C. The convoluted diaphragm flexure 412 can be made by electroforming for example and, because the features are circular about the center axis, can have good radial load capacity and stiffness but also greater range of motion and can be very compliant axially, although they may be more expensive to manufacture. A convoluted diaphragm in this system could provide greater range of motion, up to 10 mm vs 2 mm, to enable the device to "dry fire" with less chance of over-flexing the flexure were it a simple drumhead like diaphragm. Here, the diaphragm flexure 412 can be made nominally planar and then sandwiched between elements at its inside diameter (ID) and outside diameter (OD). At the OD it can be held in a structure 414, which can be brazed, bonded, press fit, or even threaded into tool body 106, where it can be seen ring 416 can also fit inside the structure 414 and push the outer flange of diaphragm flexure 412 against a step of the structure 414. At its ID, diaphragm flexure 412 can engage the shaft 214 to radially center the shaft 214 in the proximal end cap 104, and is sandwiched between flange 418, which may have deadblow hammer like characteristics as discussed herein with respect to FIG. 8, and the tool holder 108, which can be extended to create a strong axial clamping effect and can be bonded, shrunk-fit, or clamped in place.

Figure 4D:
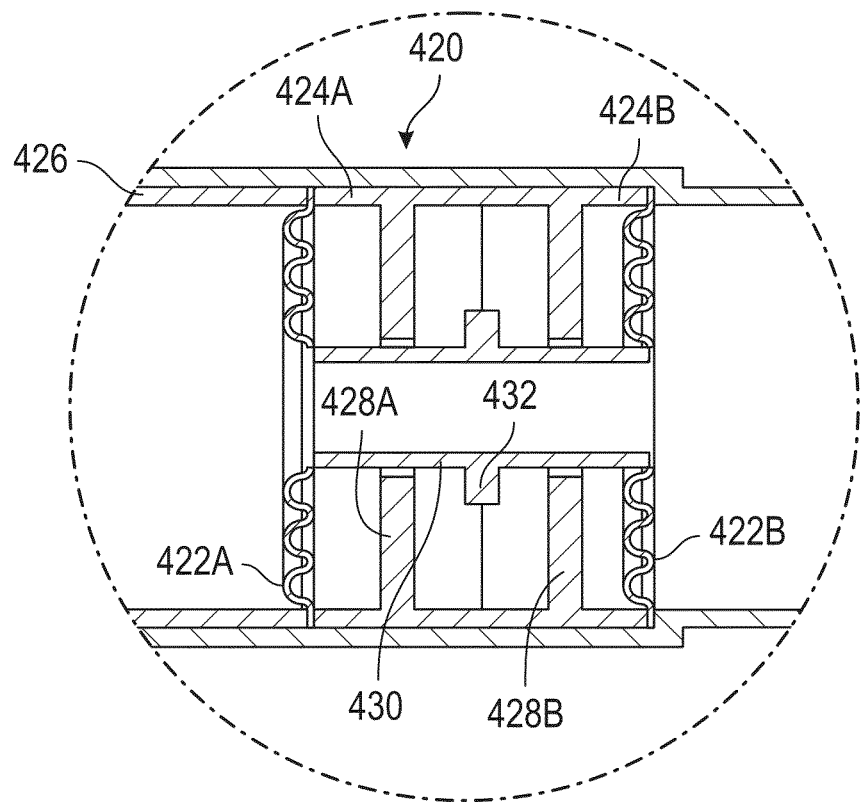
FIG. 4D shows a detail side section view of a linear electric surgical hammer impact tool consistent with at least one example of this disclosure.

In FIG. 4D, a proximal end cap 420 can have two convoluted diaphragms 422 (labeled individually as diaphragms 422A and 422B) spaced about four rod diameters apart with ring spacers 424 (labeled individually as ring spacers 424A and 424B) between them. This can provide good moment support to a rod held by the flexures. Ring 426 can lock the flexures axially in place at the OD. The ring spacers 424 can be identical and have projecting internal annular flanges 428 (labeled individually as flanges 428A and 428B). At the ID, a spacer 430 can be compressed when a rod inserted through and as with the single flexure of FIG. 4C, may be sandwiched between the rod flange 220 and tool holder 108. In FIG. 4D, the spacer 430 can have a radially projecting flange 432 that can limit the distal and proximal travel of the flexures by hitting either of flanges 428 thereby preventing damage to the flexures. In all instances of use of flexures, the distal cap 102 can be the same as the proximal cap 104 so the tool holding element 202 can be completely supported by flexures.

The proximal end cap 104 for use with sliding bearing 212A is shown as a sliding fit into the tool body 106, but this can be a threaded connection with mating tapers to ensure concentricity. It can also be permanently attached by shrink-fit, soldering, brazing, adhesion or even welding as it is closest to the surgical operation and bears greatest stress and should be free of spaces in which biological materials could infiltrate. With the proximal end cap 104 effectively permanently attached to the tool body 106, the distal end cap 102 can be removable and this can be by a threaded connection between the distal end cap 102 and the tool body 106. In the distal end cap 102 can be the rear sliding bearing 212B held in place by press-fit or the snap ring 226C as disclosed herein. The shaft 214 of the tool holder element 202 can be supported at each end and due to the concentric nature of the system, it can exert only radial parasitic loads from the cutting operation requiring guidance from the surgeon holding the tool 100. The distal end cap 102 can be closed. In other words, there can be no need for the shaft 214 to be able to protrude from the distal end cap 102.

Figure 5:
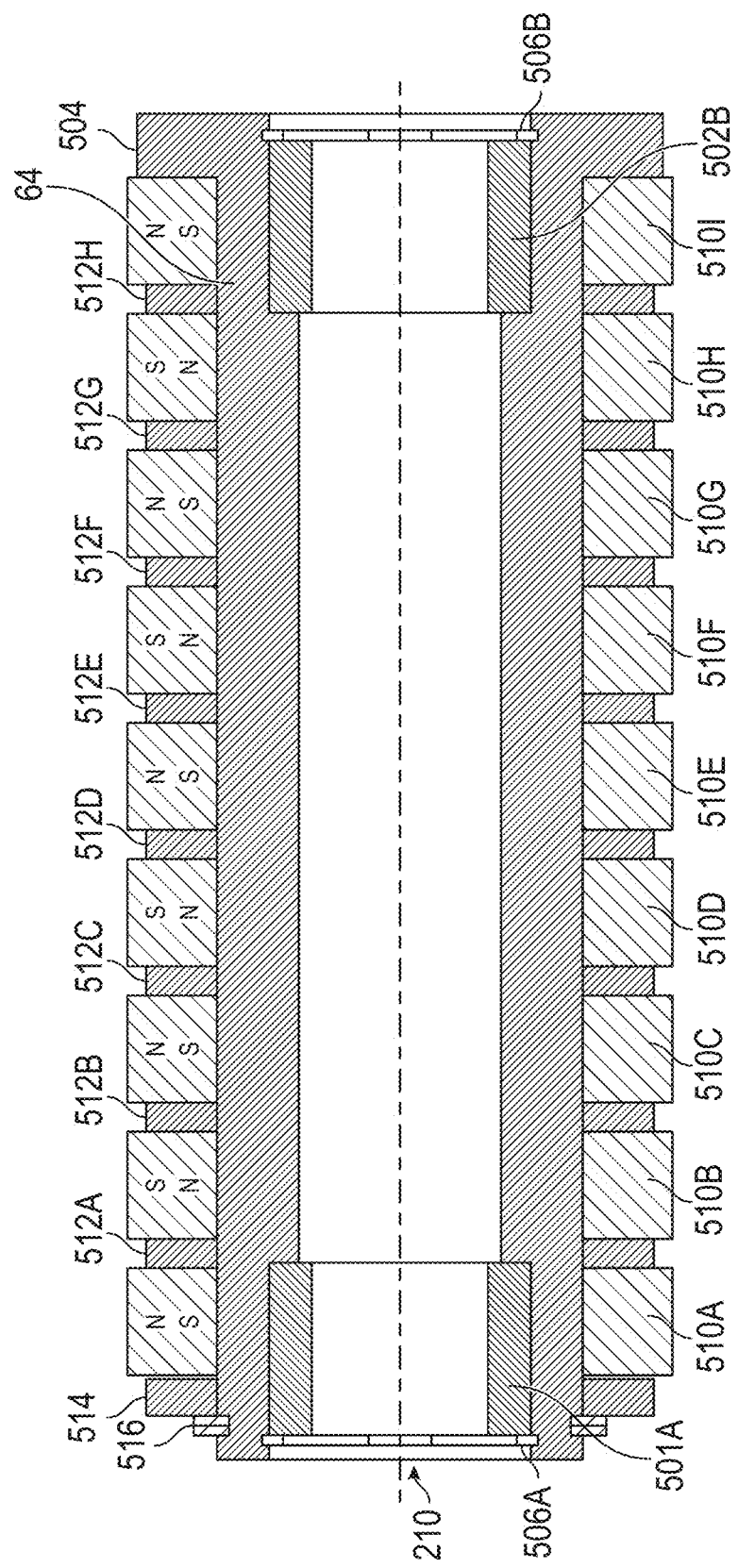
FIG. 5 shows a detail side section view of a linear electric surgical hammer impact tool consistent with at least one example of this disclosure.

As shown in FIG. 5, the impact motion element 210 can slide along the smooth shaft 214 on the same size and type of Rulon bearings as used to support the shaft 214. Smooth bore bearings, or bearings with grooves to promote the formation of a dynamic supporting air film when the speed rises, typically about 0.5 m/second, to reduce friction and wear and increase efficiency even further. Bearings 502 in the proximal and distal ends of the impact motion element 210 central ferromagnetic core structure 504 are retained by snap rings 506 (labeled individually as snap rings 506A and 506B). Here a magnetic member is shown to interact with the coil structure 208 as a Lorentz force actuator. Magnets 510 (labeled individually as magnets 510A, 510B, 510C, 510D, 510E, 510F, 510G, 510H, and 510I) may be radially polarized and shown spaced with spacers 512 (labeled individually as spacers 512A, 512B, 512C, 512D, 512E, 512F, 512G, and 512H) such that a magnetic field can project radially from the north of one magnet, through the current carrying coils and back into a south of an adjacent magnet. As the magnetic field crosses the circumferentially wound current carrying coils, a force by the right-hand rule is created axially to move the impact motion element 210. The Lorentz force affect can move mass to create an impact inertia and a long stroke. Alternatively, every other magnet of magnets 510 can be axially polarized so the magnets 510 can be arranged to form a N-S:S-N:N-S . . . array or a Halbach array to give a somewhat stronger field effect at the potential expense of somewhat more elaborate manufacturing.

As disclosed herein, the impact motion element 210 can be supported within the coil structure 208 by linear bearings, which may be self-acting aerostatic bearings. This radially decouples the impact motion element 210 from the tool holding element 202. This can provide a high level of concentricity and efficiency for the electric motor.

Linear electric motors disclosed herein can be a Lorentz force motor, but variable reluctance and hysteresis motors can also be used, although more difficult to control, and may be larger, the mechanical structure simpler and hence could have cost advantages. For a variable reluctance motor, the magnetic material of the impact motion element 210 can consist of soft magnetic material, such as laminated silicon steel, with multiple projections acting as magnetic poles. For a hysteresis motor, the magnetic material of the impact motion element 210 may be a smooth cylinder of hard chrome or cobalt steel with large hysteresis loop properties.

The impact motion element 210 can have the core structure 504 with one end solid as shown and the other end has a washer 514 held in place with a snap ring 516. The entire magnet assembly of the impact motion element 210 can be epoxied together. A thin, on the order of ½ to 1 mm thick, non-magnetic stainless steel tube can encapsulate the entire assembly to ensure no magnet chips would short the motor in case of a fracture. As disclosed herein, this element can be made from a resilient material in which case it can project to also be the impact surface thereby creating a lower peak but longer duration impact force akin to using a dead blow hammer. For a fast hard crisp blow though, hard steel on hard steel can be used. The opposite end of the impact motion element 210 can be used for retraction.

To drive a tool forward for cutting, the user pushes the linear electric surgical hammer impact tool 100 forward and the surface 232 of the tool holder 108 can come to rest on the front snap ring (or surface) 230 of the proximal end cap 104. The controller 206 can control the coil to retract the impact motion element 210 and then drive it forward to achieve the speed needed to generate the energy of impact desired. The flange 220 of the tool holder element 202 can thus be impacted by the proximal end of the impact motion element 210. To retract a tool, the user pulls back on the linear electric surgical hammer impact tool 100, which can cause the flange 220 to come to rest against the inside surface 236 of end cap 104 and bring the rear impact flange 222 into the range of the impact motion element 210 to be accelerated from the proximal end to the distal end of the coil structure 208 from a ready position near the proximal end of the linear electric surgical hammer impact tool 100. The speed of the impact controls the energy and hence the force delivered upon impact.

The microphone 116 can be connected to the controller 206, which can be a microprocessor controller, for control of current to the coil structure 208 to hear the user speak commands as they are using the linear electric surgical hammer impact tool 100. As an example, a surgeon, as he or she is observing the impact, can speak "less force," "more force," "faster," "slower," etc. and it will be understood that the linear electric surgical hammer impact tool 100 can be controlled by the user to meet their needs and style of use using his or her voice. The controller 206 can learn to respond to a particular user.

For the controller 206 to obtain less force it can control the distance of acceleration and current to the coil structure 208 to vary the force and hence the acceleration of the impact motion element 210. The impact force can be proportional to energy, which is the product of one half the mass of the impact motion element 210 and its velocity squared. "Faster" can mean that the controller 206 would then, after impact, bring the mass back faster to a starting point for the next impact, and then accelerate the impact motion element 210. The controller 206 can operate in current control mode, to generate the desired force, and the voltage follows according to the speed as the impact motion element 210 accelerates. This Lorentz force actuator has the moving element travel further than the pitch between magnets, and hence the sensing elements 216, such as Hall effect sensors, can be dispersed in the coil structure 209 to sense the polarity of the magnets beneath them, and switch the current direction to the coil 208 to ensure that the force is always in the proper direction as the impact motion element 210 accelerates. This type of longer-range motion linear electric actuator can have three independently controllable coils, which are switched in a sinusoidal fashion to give smooth motion of the moving magnet member (e.g., the impact motion element 210).

Figure 6A:
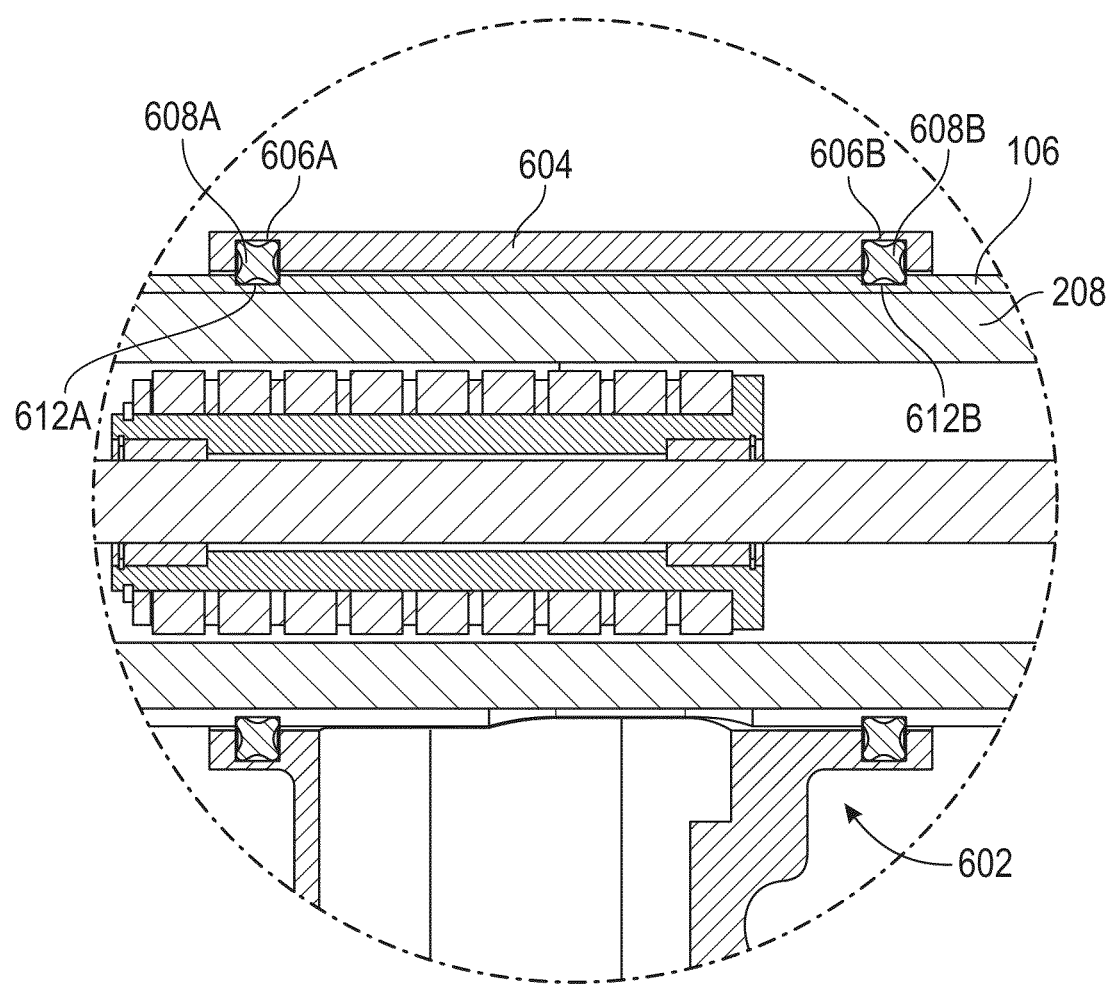
FIG. 6A shows a partial cross section of a mounting of a handle and housing of a linear electric surgical hammer impact tool consistent with at least one example of this disclosure.
Figure 6B:
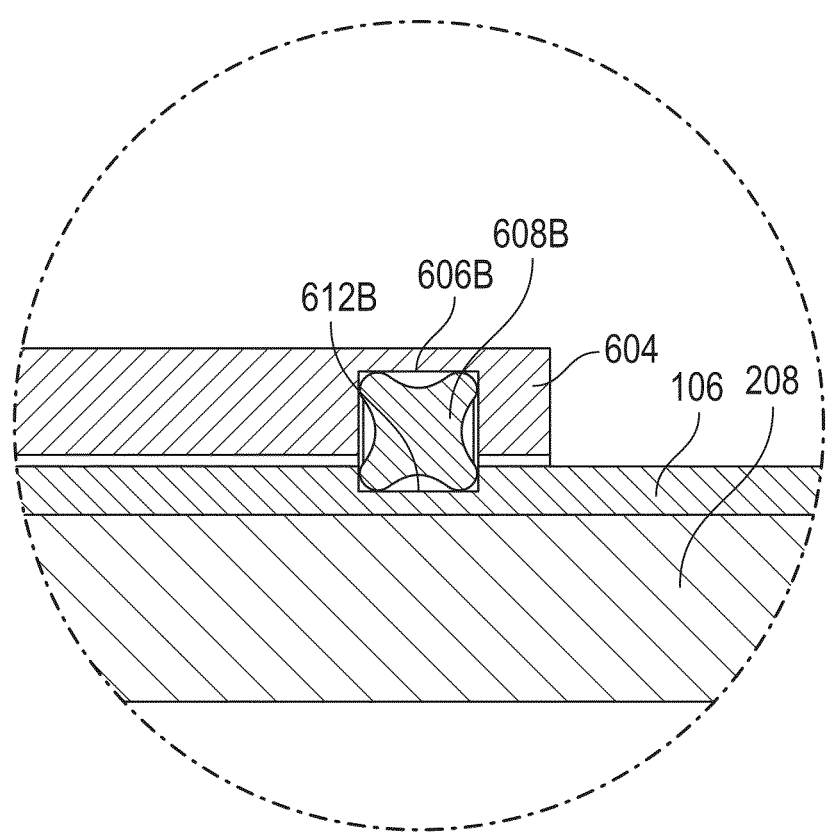
FIG. 6B shows a detail partial cross section of the mounting of the handle and housing of FIG. 6A consistent with at least one example of this disclosure.

As the impact motion element 210 is accelerated, there is an equal and opposite force on the coil structure 208, which the user can feel, although it can be absorbed somewhat by the mass of the system. FIG. 6A shows a partial cross section of a mounting of the handle 602, which can have a top portion 604 so that it can contain circumferential internal grooves 606 (labeled individually as grooves 606A and 606B) for accepting dampening elements 608 (labeled individually as dampening elements 608A and 608B), such as "quad rings" to secure housing 118. The housing 118 can have corresponding external grooves 612 (labeled individually as grooves 612A and 612B) as shown in FIG. GB, where an inner diameter lobes of the dampening element 608B engage the sides of the groove 606B, while the outer diameter lobes of the dampening element 608B engage the sides of grooves 612 in the housing 118. While FIGS. 6A and 6B show square dampening elements, circular O-rings can be used.

Figure 7:
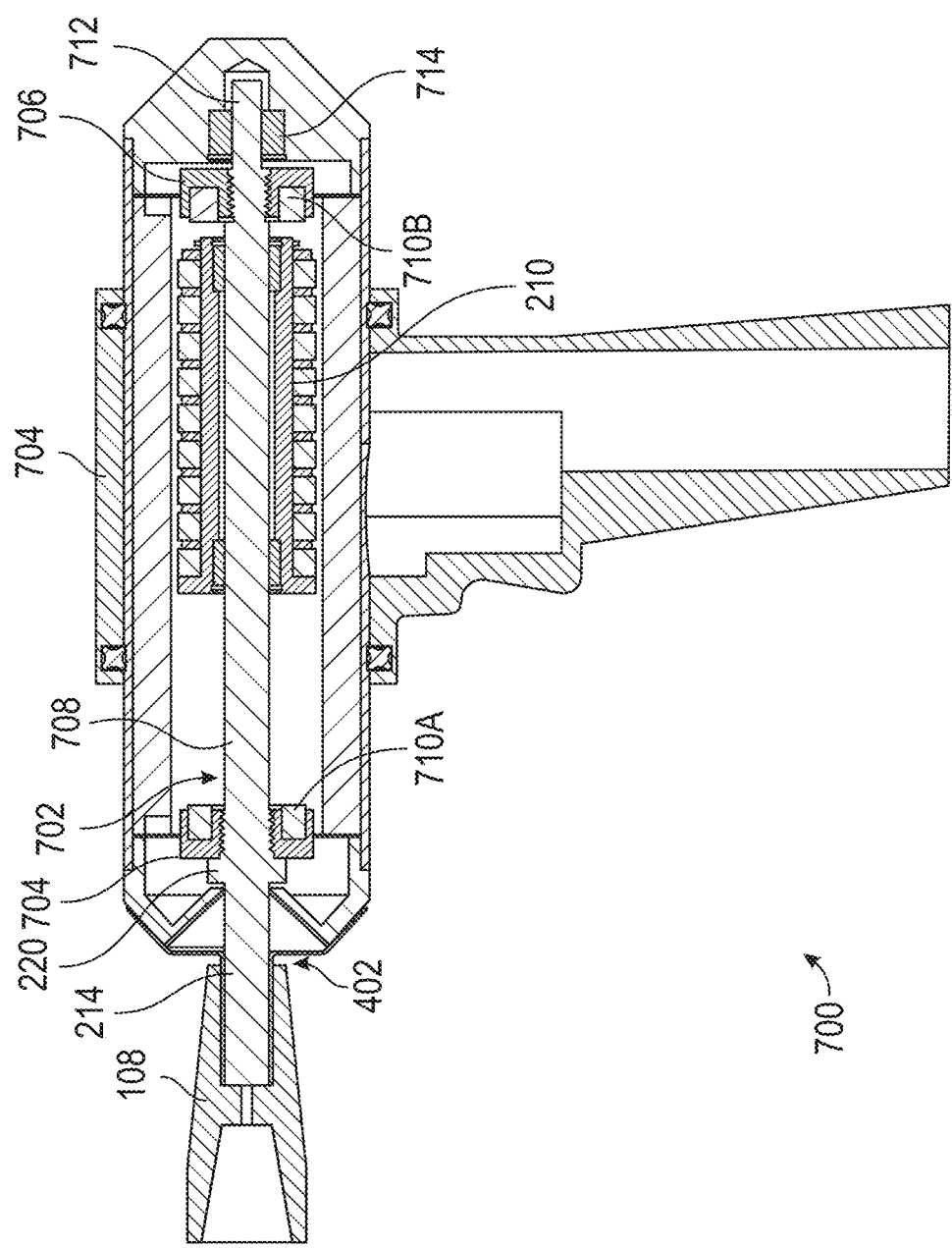
FIG. 7 shows a cross section of a linear electric surgical hammer impact tool consistent with at least one example of this disclosure.

FIG. 7 shows a cross section of a linear electric surgical hammer impact tool 700 consistent with at least one example of this disclosure. The linear electric surgical hammer impact tool 700 can include a tool holder element 702 that can have a proximal impact flange 704 for driving a tool secured to tool holder 108 and distal impact flange 706 for retracting the tool. Proximal impact flange 704 and distal impact flange 706 can be separate elements threaded onto a rod 708. The impact flanges 704 and 706 can have cavities for resilient polymer elements 710 (labeled individually as resilient polymer elements 710A and 710B) to provide the linear electric surgical hammer impact tool 700 with more of a deadblow hammer performance as disclosed herein. The distal end 712 of the rod 708 can have a hex shape machined into it to slide into a hex bushing 714. If a diaphragm type beating is used, then the rod 708 and diaphragm bearing can be designed to properly engage one another.

As disclosed herein, in order to deliver a longer duration lower force, a resilient low loss polymer, such as hard cast polyurethane, can be incorporated into the contact surface of the impact motion element 210, or as a washer placed around the shaft 214 of the tool holder element 702 at the impact surfaces of the flanges 220 and 222 (as shown in at least FIG. 2).

Figure 8A:
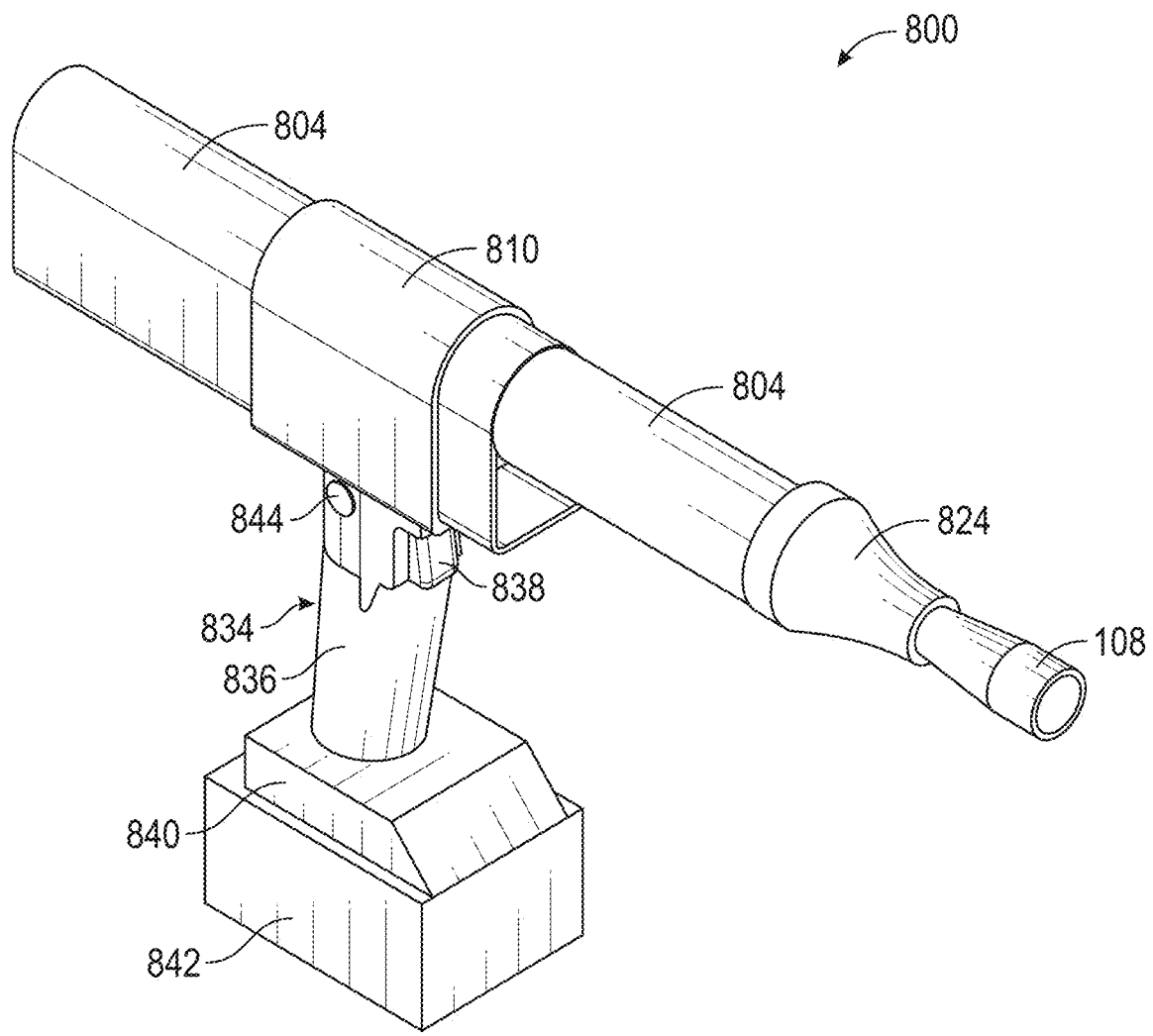
FIG. 8A shows a tube motor for use in a linear electric surgical hammer impact tool consistent with at least one example of this disclosure.
Figure 8B:
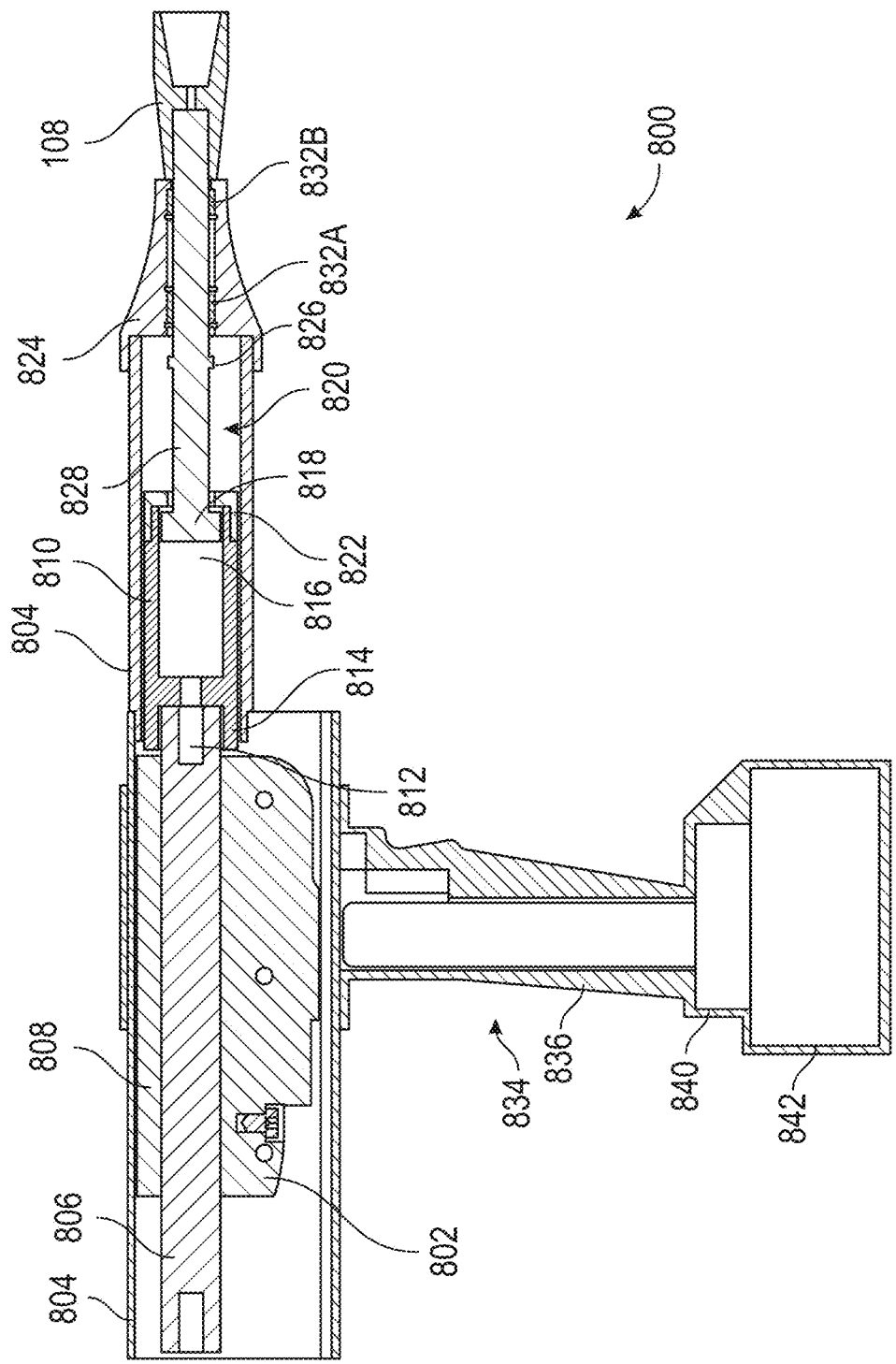
FIG. 8B shows a cross section of a linear electric surgical hammer impact tool consistent with at least one example of this disclosure.
Figure 8C:
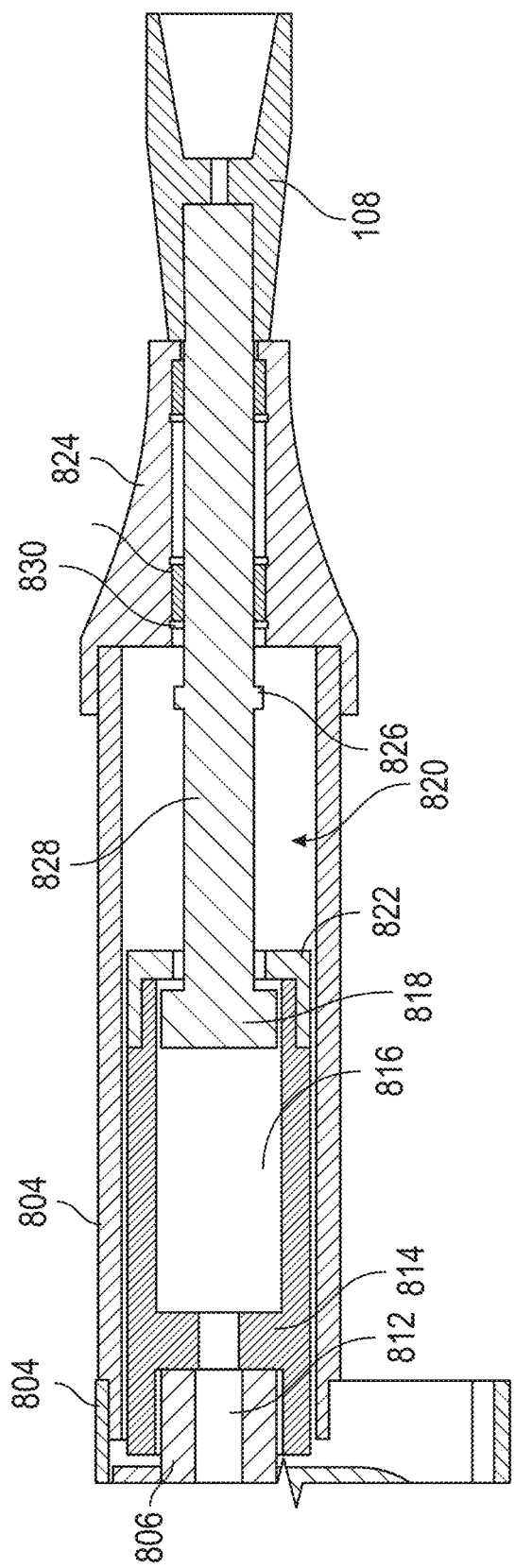
FIG. 8C shows a detail cross section of a proximal region of a linear electric surgical hammer impact tool consistent with at least one example of this disclosure.

FIGS. 8A, 8B, and 8C show a linear electric surgical hammer impact tool 800 consistent with at least one example of this disclosure. The linear electric surgical hammer impact tool 800 can include a tube motor 802. As disclosed herein, the tube motor 802 can be mounted inside a housing 804 and a core 806 can move back and forth within the motor stator 808. A rod impactor 810, shown in tubular form, can be attached to an end of the moving core 806 by a threaded stud 812 threaded into the end of the core 806 and a distal flange 814 of the rod impactor 810. A cylindrical space 816 within the rod impactor 810 can receive a flared end 818 of a tool holding element 820 and this flared end 818 can be what is impacted to drive the tool holding element 820 in the proximal or distal direction to drive a tool forward or to retract the tool. It is understood that while shown here as a tubular structure, rod impactor 810 can also be planar, as in the body of a turnbuckle so its sides are open and is thus one piece and the tool holder element 820 inserted thereby negating the need for end 822 to be a separately attachable element.

The axial motion space in the rod impactor's internal cavity, e.g., cylindrical space 816, can be equal to the stroke of the moving core needed to generate the desired maximum impact energy. This stroke distance can be determined by a maximum attainable force and speed of the tube motor 802 and the combined mass of the moving core 806 and the tubular rod impactor 810. The motor force-speed curve can be used in conjunction with the total moving mass to determine the acceleration as a function of speed and hence the distance travelled to compute the stroke required and this stroke plus the thickness of the flared end 818 gives the total length of the cavity 816. FIG. 9B shows the linear electric surgical hammer impact tool 800 in a retracted mode where the user can be pushing the linear electric surgical hammer impact tool 800 forward to engage an operation tool (e.g., a broach not shown but held in the tool holder 108) with the object to be operated on (e.g., a femur) by the tool. Hence the distal end of tool holder 108 can be touching the proximal face of the proximal end cap 824 and a motion limiting flange 826 of the tool holding element 820 can be spaced distally rearward from the end cap 824. The moving core 806 can be ready to be accelerated forward until the proximal face of flange 814 impacts the distal face of flared end 818 transferring the kinetic energy of the core 806 and rod impactor 810 to the tool holder element 820. This can send a stress wave down a shaft 828 where it then is transferred to the tool holder 108 and on into an operating tool to do work on an object, such as driving a reamer into bone.

To retract the operation tool, the user pulls back on the linear electric surgical hammer impact tool 800 and the motion limiting flange 826 of the tool holding element 820 can contact the end cap 824 (or a snap ring 830) while the core 806 is moved all the way forward by a system controller, such as controller 206. It then accelerates distally and the distal inside surface of impactor end cap 822 impacts proximal surface of flared end 818 imparting energy to retract the operating tool.

The tool holding element 820 can be supported by a bearing system that can withstand radial and moment loads and ensure efficient accurate axial motion so the flared end 818 does not contact the bore 816. Bore 816 is not pressurized, as clearance, such as 1 mm radially, can exists between the relative moving elements to allow for essentially unrestricted airflow to ensure energy is not lost to pumping air through a restriction. For example, two bearings 832 (labeled individually as bearings 832A and 832B) can be separated by at least 3 or more, such as 5, diameters of the shaft 828. In addition, the distance of the flange 818 from the bearing 832A can be about equal to the spacing between the bearings. In this way, radial motion of the flared end 818 can be on the order of radial clearance between the bearings and the shaft 828, which can be about 0.1 mm, and hence ensure the flared end 818 does not contact the inside of the bore 816. As disclosed herein, the linear motion bearings 832 can be sliding or rolling element or flexural element bearings chosen for the type of application and performance desired.

The linear electric surgical hammer impact tool 800 can include a handle 834 with grip 836 and trigger 838. Within the handle 838 and a base 840 can be control circuits, such as controller 206, and a removable and rechargeable battery 842, which slides into place. The top of the handle 834 can be connected to the mounting block 810. A dampening interface between the two may also be used as disclosed herein. A speaker/microphone 844 can enable voice control of the linear electric surgical hammer impact tool 800 to make it respond to user commands and speak back to the user about the state of the device as disclosed herein.

Any embodiments disclosed herein can enable advanced control where, for the tool used and the state of the patient and the operation, the linear electric surgical hammer impact tools can automatically adjust the impact energy and frequency. To achieve intelligent control of the tools as an operation progresses, sensors such as sensors 224, can be used to monitor a position of the tool holding elements, such as tool holding elements 202, 702, and 820, with respect to a tool's position, or the position sensor included in commercial tube motors may be used. In addition, an accelerometer in the tool (or its adaptor element that enables its proper positioning with respect to the tool holder 108) can also provide additional feedback to enable ascertaining the progress of the tool into the bone. Consistent with embodiments disclosed herein, a camera can look upon the operation to also monitor progress of the tool into the bone with each impact, and information from the camera and the accelerometer can be sent to control electronics, such as controller 206, by wireless link.

Figure 9A:
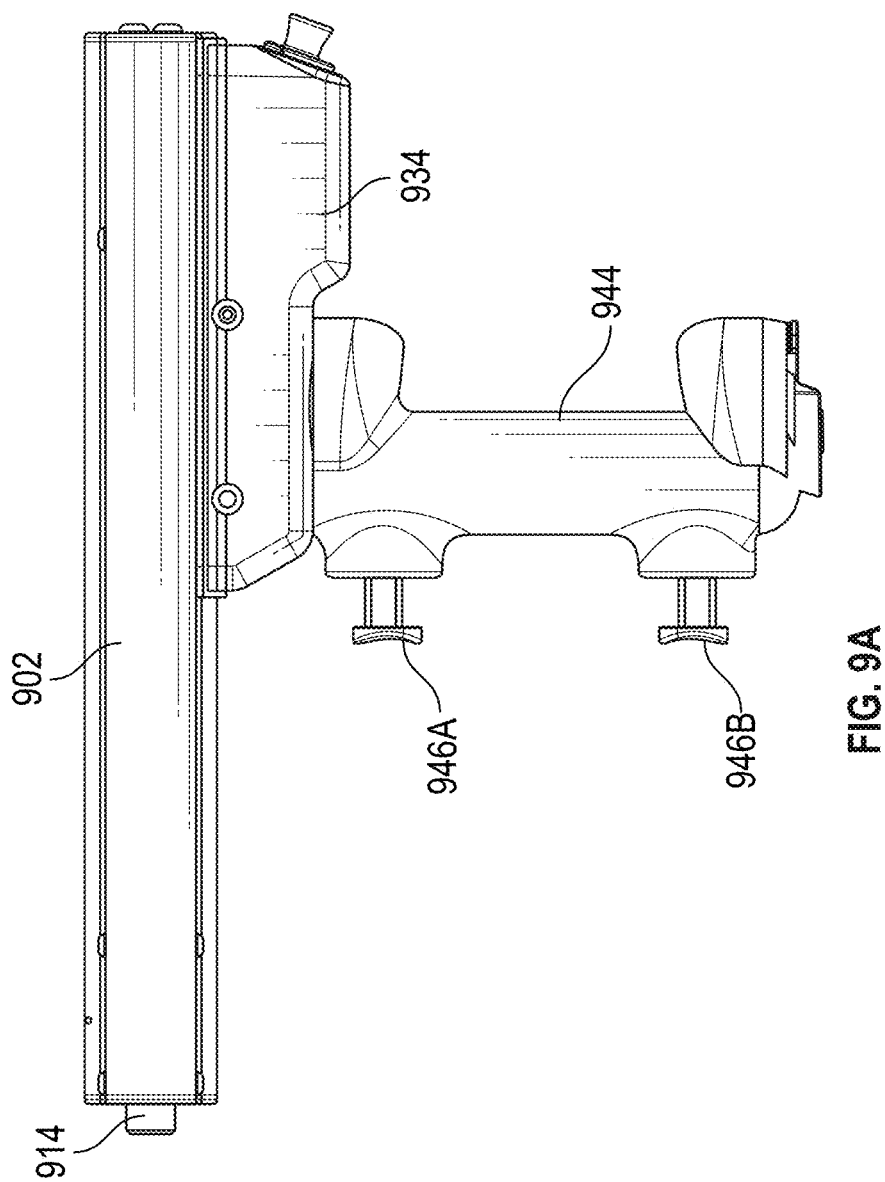
FIGS. 9A and 9B show a linear electric surgical hammer impact tool in accordance with at least one example of this disclosure.
Figure 9B:
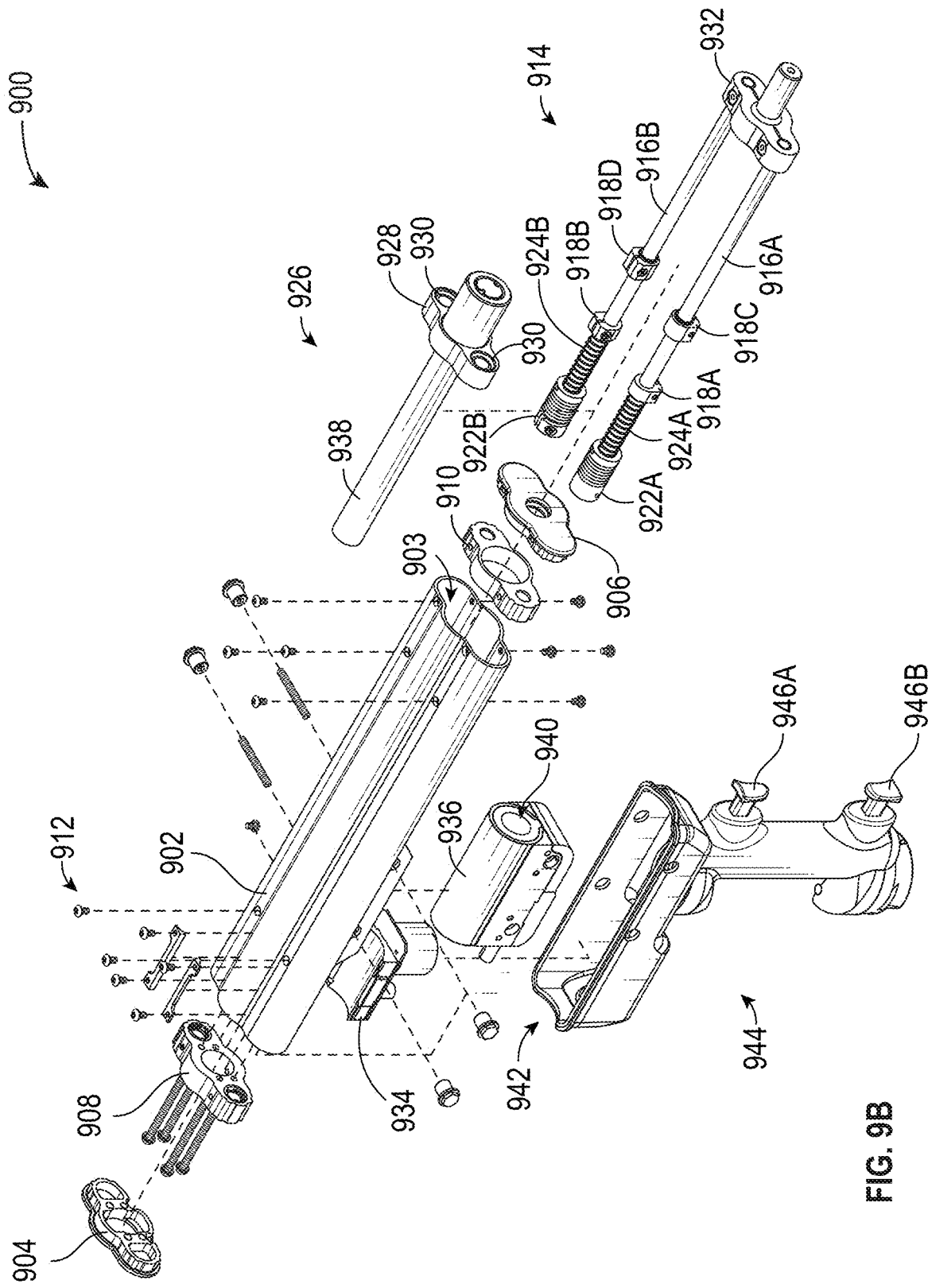

FIGS. 9A and 9B show a linear electric surgical hammer impact tool 900 in accordance with at least one example of this disclosure. The linear electric surgical hammer impact tool 900 can include a housing 902 having a rear cap 904 and a front cap 906. A rear flange 908 and a front flange 910 can be secured to housing 902 proximate the rear cap 904 and the front cap 906, respectively, using bolts 912. The housing 902 can define a cavity 903 that extends along a longitudinal axis of the housing 902.

A shuttle 914 can be located at least partially inside the housing 902 and include rods 916 (labeled individually as rods 916A and 916B). During operation, the shuttle 914 can translate along the longitudinal axis of the housing 902. Collars 918 (labeled individually as collars 918A, 918B, 918C, and 918D) can be connected to the rods 916 and define a travel space 920. Stated another way, the collars 918 can limit movement of the shuttle 914 to a predefined range of stroke. The position of the collars 918 can be adjusted to increase or decrease the stroke length for the shuttle 914.

The shuttle 914 can include masses 922 (labeled individually as masses 922A and 922) and springs 924 (labeled individually as springs 924A and 924B). The masses 922 and the springs 924 can press against the rear flange 908 to bias the shuttle 914 towards a front end (sometimes referred to as a proximal end) of the linear electric surgical hammer impact tool 900. The position of the collars 918A and 918B can be changes do adjust the amount of biasing force generated by the spring 924. Thus, the masses 922 and the springs 924 can act as a biasing element.

The linear electric surgical hammer impact tool 900 can include a slider 926 that translates back and forth along the longitudinal axis of and within the cavity 903 defined by the housing 902. The slider 926 can include a slider flange 928 that defines holes 930 (labeled individually as holes 930A and 930B). The rods 916 can pass through the holes 930 and the slider flange 928 can be position in between the collars 918 to limit a range of motion of the slider 926 relative to the shuttle 914. The slider flange 928 can also be located in between the collars 918C and 918D and a shuttle flange 932.

During an impact stroke, the slider flange 928 can impact the collars 918C and 918D to drive the shuttle 914, and a tool (e.g., a broach) attached to the shuttle 914, forward. During a retraction stroke, the slider flange 928 can impact the collars 918A and 918B to drive the shuttle 914, and the tool attached to the shuttle 914 reward.

Movement of the slider 926 can be controlled by a controller 934 that can control a motor 936. As disclosed herein, a slider shaft 938 can pass though a through hole 940 defined by the motor 936. The slider shaft 938 can also include one or more magnets as disclosed herein to cooperate with the motor 936 to cause the slider 926 to oscillate back and forth to generate impact forces. The controller 934 can be a programmable controller or other circuitry as disclosed herein. The motor 936 can be a tube motor or other motor as disclosed herein. Sensors, such as Hall effect sensors, as disclosed herein, can be used to monitor the position of the slider 926 as disclosed herein with respect to impact motion element 210. Sensors and magnets are not shown in FIG. 9 for clarity, but can be any configuration as disclosed herein.

The controller 934 and the motor 936 can be contained in a cavity 942 defined by a handle 944. The handle 944 can include triggers 946 (labeled individually as triggers 946A and 946B). During use, a surgeon can press one of triggers (e.g., the trigger 946A) to cause the linear electric surgical hammer impact tool 900 to generate an impact force (sometimes called a driving force) needed to drive a tool forward. Pressing the other trigger (e.g., the trigger 946B) can cause the linear electric surgical hammer impact tool 900 to generate an impact force (sometimes called a retraction force) to extract the tool from bone.

Figure 10A:
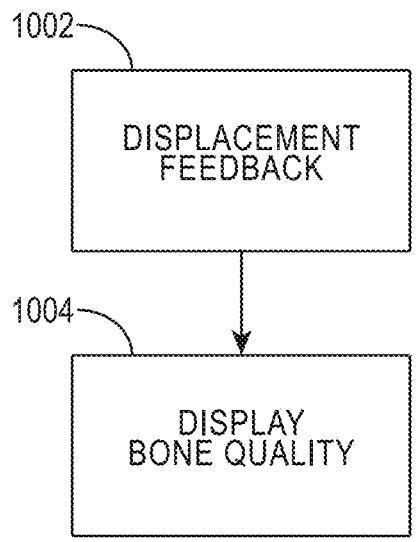
FIGS. 10A, 10B, and 10C show options for bone quality assessment consistent with at least one example of this disclosure.
Figure 10B:
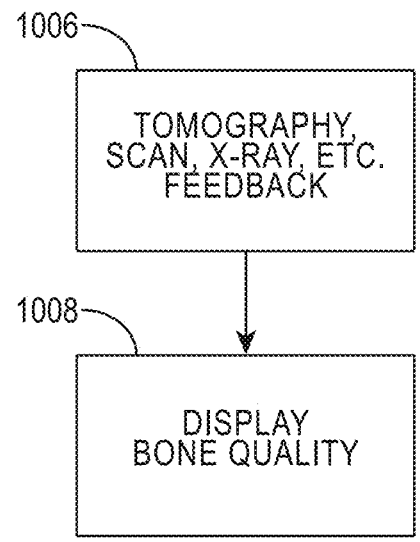
Figure 10C:
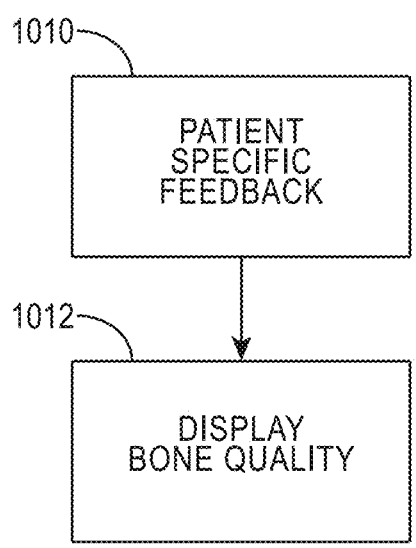

FIGS. 10A, 10B, and 10C show options for bone quality assessment consistent with at least one embodiment of this invention. Input into a controller of an initial assessment by a surgeon of the bone quality (e.g., the surgeon inputting the bone quality into a tool or some user interface, or some outside assessment of bone quality via X-ray or CT), which the surgeon can speak to the tool and a microphone, receives the words. Using a wireless link, the controller of the tool can access an external computer, which could process the information and a control plan can downloaded to the tool and used to better control the tool for the operation at hand.

As shown in FIG. 10A, the various linear electric surgical hammer impact tools disclosed herein can provide feedback as to displacement of tools (1002). Based on the displacement, a bone quality can be determined. For example, large displacements can mean poor quality as the tool easily displaces bone. Small displacement may be higher bone quality since the tool is not able to displace as much bone for a given setting. Once an estimation of the bone quality is made, the value can be displayed to the surgeon (1004).

As shown in FIG. 10B, tomography scan, x-rays, or other scan data can he used to form an estimation of bone quality (1006). For example, if x-rays are faint, then bone density may be low and low bone density can be equated to poor bone quality. Dark and/or clear x-rays may indicate dense bone having a higher bone quality. Once an estimation of the bone quality is made, the value can be displayed to the surgeon (1008).

As shown in FIG. 10C, a surgeon can enter various factors for a patient, such as age, gender, race, data from pre-operative scans, etc. (1010). Using the various data, a computing system can use lookup tables, actuarial tables, anonymized data from other patients, etc. to formulate an estimate of bone quality. Based on the various factors, the estimated bone quality can be determined and displayed to the surgeon (1012).

Figure 11:
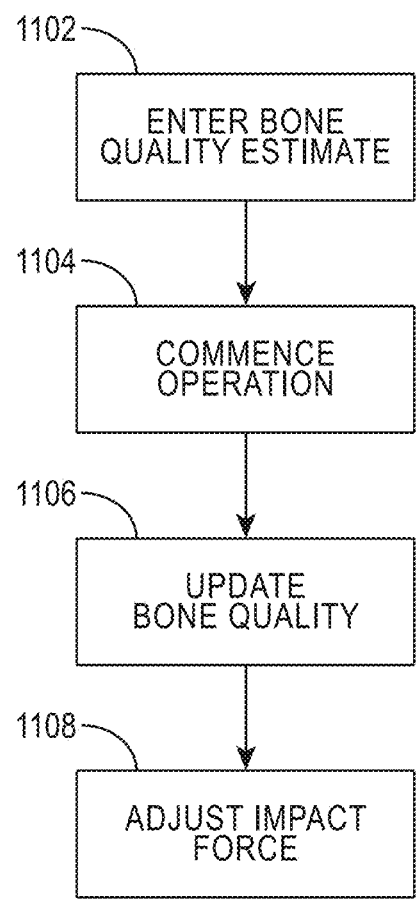
FIG. 11 shows a flowchart of logic usable for controlling a linear electric surgical hammer impact tool consistent with at least one example of this disclosure

FIG. 11 shows a method for controlling a linear electric surgical hammer impact tool consistent with at least one example of this disclose. Once the bone quality is assessed and entered into a controller (1102), the operation may commence (1104). For example, bone quality scores can range from 1, poor quality bone, to 5 for high quality bone. Depending on the bone quality the tool may be set to deliver a predetermine impact force. For example, for low bone quality a low impact force can be set. For a higher bone quality, a higher impact force can be set.

During the operation, the bone quality can be updated (1106), using the tool position sensor sensing, based on how quick the tool is moving into the bone on the first few broaches. For example, if the broach is sliding in faster than expected due to weak cancellous bone (e.g., osteoporosis), the bone quality can be updated. The goal of the initial bone quality assessment can be to modulate the starting force (initial impact) and adjust the amount of subsequent impact modulation as the tool progresses into the bone (1108). As the tool keeps impacting as broaches are increased in size, for example, the energy is monitored and remains unchanged when there is "maximum" broach movement down the femur canal (as measured by the position sensor) for example.

Updating the bone quality can be a continuous process. For example, as the position sensor notes that the broach or implant is not advancing forward as much ("medium movement forward"), which can indicate the end of travel. Continuing to impact the bone harder may damage the bone so the tool can automatically modulate the force down a specific percentage a more significant decrease for weaker bone, less significant for stronger bone, etc.

Figure 12:
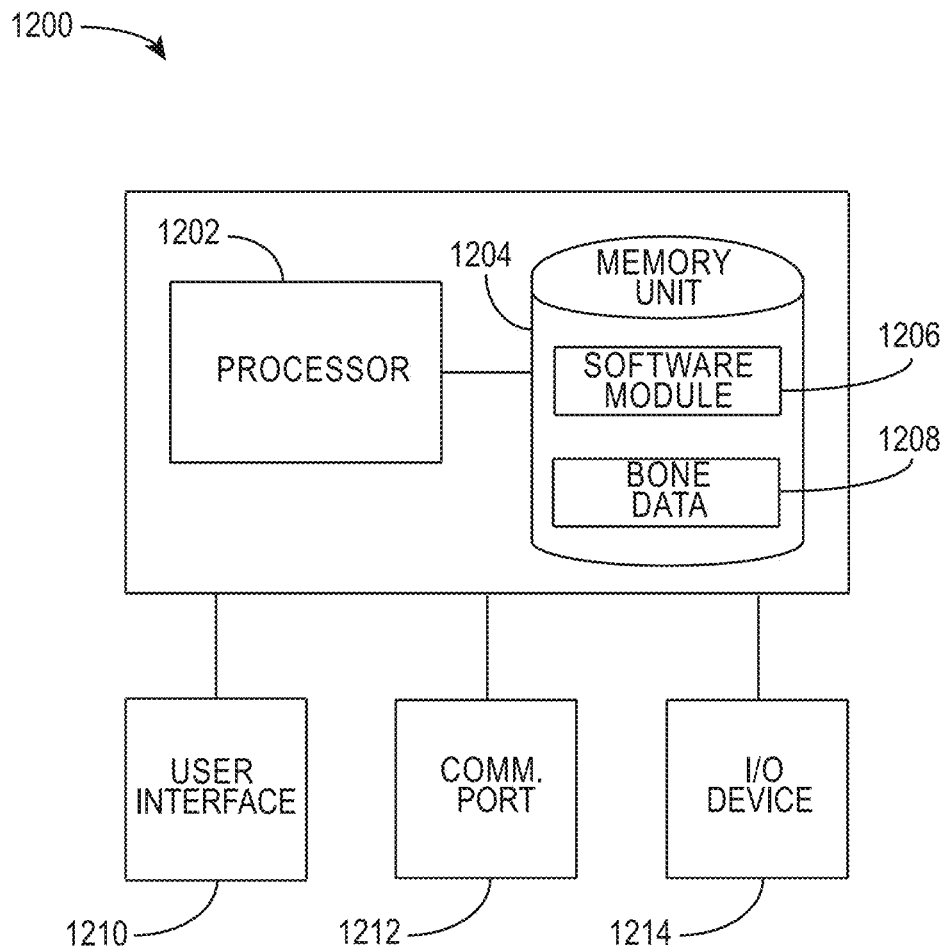
FIG. 12 shows a schematic of a controller consistent with at least one example of his disclosure Corresponding reference characters indicate corresponding parts throughout the several views. The exemplifications set out herein illustrate exemplary embodiments of the disclosure, and such exemplifications are not to be construed as limiting the scope of the disclosure in any manner.

FIG. 12 shows an example schematic of controller 1200, such as the controllers 206 and 934, in accordance with at least one example of this disclosure. As shown in FIG. 12, controller 1200 can include a processor 1202 and a memory 1204. The memory unit 1204 can include a software module 1206 and bone data 1208. While executing on the processor 1202, the software module 1206 can perform processes receiving displacement data, determining bone quality, adjusting an impact force of a tool, etc., including, for example, one or more stages included in the methods described below with respect to FIGS. 10 and 11. As disclosed herein, bone data 1208 can include formulas, lookup tables, actuarial tables, patient data, etc. that can be used to determine bone quality as disclosed herein. Bone data 1208 can also include data for correlating impact forces desirable for given bone qualities and for various sizing of tools, such as rasps and/or broaches. Controller 1200 can also include a user interface 1210, a communications port 1212, and an input/output (110) device 1214.

The user interface 1210 can include any number of devices that allow a user to interface with the controller 1200. Non-limiting examples of the user interface 1210 can include a keypad, such as buttons located on a housing of a linear electric surgical hammer impact tool, a microphone, a display (touchscreen or otherwise and connected to controller via a wired or wireless connection), etc.

The communications port 1212 may allow the controller 1200 to communicate with various information sources and devices, such as, but not limited to, remote computing devices such as servers or other remote computers. For example, remote computing devices may maintain data, such as patient scan data, that can be retrieved by the controller 1200 using the communications port 1212. Non-limiting examples of the communications port 1212 can include, Ethernet cards (wireless or wired), Bluetooth® transmitters and receivers, near-field communications modules, etc.

The I/O device 1214 can allow the controller 1200 to receive and output information. Non-limiting examples of the I/O device 1214 can include, sensors, such as Hall effect sensors, a camera (still or video), a microphone, etc. For example, the I/O device 1214 can allow the controller 1200 to directly receive patient data from a CT scanning device, x-ray machine, etc. As another example, the I/O device 1214 can include a Hall effect sensor that transmits one or more signals received by the processor 1202. The processor 1202 can then determine a position of a slider and/or an impact force to be generated by the slider based on the position of the slider.

NOTES

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more," In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described. examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such m s are entitled.

What is claimed is:

1. A linear electric surgical hammer impact tool comprising:
    a housing defining a cavity extending along a longitudinal axis of the housing;
    a slider located inside the cavity and arranged along the longitudinal axis of the housing;
    a shuttle located inside the cavity and arranged along the longitudinal axis of the housing, the shuttle comprising a first set of collars and a second set of collars, the shuttle including:
        a shuttle flange:
        a first rod extending from the shuttle flange, a first collar from the first and second set of collars attached to the first rod; and
        a second rod extending from the shuttle flange a second collar from the first and second set of collars attached to the second rod;
    a motor configured to drive the slider along the longitudinal axis in a first direction and a second direction; and
    a tool holder connected to the shuttle, wherein motion of the slider in the first direction causes the slider to contact the first set of collars and motion of the slider in the second direction causes the slider to contact the second set of collars.

2. The linear electric surgical hammer impact tool of claim 1, wherein the slider comprises a slider flange that contacts the first and second set of collars during motion of the slider.

3. The linear electric surgical hammer impact tool of claim 1, wherein the motor is a tube motor and a slider shaft passes at least partially through the tube motor.

4. The linear electric surgical hammer impact tool of claim 1, wherein the shuttle comprises a biasing element configured to bias the shuttle in the first direction.

5. The linear electric surgical hammer impact tool of claim 1, further comprising a sensor arranged to detect a position of the slider within the cavity.

6. The linear electric surgical hammer impact tool of claim 1, further comprising a controller operative to perform operations comprising:
    determining an estimate of a bone quality; and
    increasing or decreasing an impact force generated by the linear electric surgical hammer impact tool based on the estimate of the bone quality.

7. The linear electric surgical hammer impact tool of claim 1, further comprising a controller operative to perform operations comprising:
    determining a displacement of a tool attached to the tool holder; and
    increasing or decreasing an impact force generated by the linear electric surgical hammer impact tool based on the displacement of the tool.

8. The linear electric surgical hammer impact tool of claim 1, further comprising a handle that defines a cavity sized to receive electronics and the motor.

9. The linear electric surgical hammer impact tool of claim 8, wherein the handle comprises:
    a first trigger operative to cause the slider to move in the first direction; and
    a second trigger operative to cause the slider to move in the second direction.

10. A linear electric surgical hammer impact tool comprising:
    a housing defining a cavity extending along a longitudinal axis of the housing;
    a slider comprising a slider shaft located inside the cavity and arranged along the longitudinal axis of the housing;
    a shuttle located inside the cavity and arranged along the longitudinal axis of the housing, the shuttle comprising:
        a shuttle flange,
        a first rod extending from the shuttle flange, a first collar and a second collar attached to the first rod, and a second rod extending from the shuttle flange, a third collar and a fourth collar attached to the second rod, the first collar, the second collar, the third collar, and the fourth collar defining a stroke of the slider;

a tube motor defining a through hole sized to receive the slider shaft, the tube motor configured to drive the slider along the longitudinal axis in a first direction and a second direction; and a tool holder connected to the shuttle, wherein motion of the slider in the first direction causes the slider to contact the first collar and the third collar and motion of the slider in the second direction causes the slider to contact the second collar and the fourth collar.

11. The linear electric surgical hammer impact tool of claim 10, wherein the shuttle comprises a biasing element configured to bias the shuttle in the first direction.

12. The linear electric surgical hammer impact tool of claim 10, further comprising a sensor arrange to detect a position of the slider within the housing.

13. The linear electric surgical hammer impact tool of claim 10, further comprising a controller operative to perform operations comprising:

determining an estimate of a bone quality; and increasing or decreasing an impact force generated by the linear electric surgical hammer impact tool based on the estimate of the bone quality.

14. The linear electric surgical hammer impact tool of claim 10, further comprising a controller operative to perform operations comprising:

determining a displacement of a tool attached to the tool holder; and increasing or decreasing an impact force generated by the linear electric surgical hammer impact tool based on the displacement of the tool.

15. The linear electric surgical hammer impact tool of claim 10, further comprising:

a handle that defines a cavity sized to receive electronics and the motor;

a first trigger operative to cause the slider to move in the first direction; and a second trigger operative to cause the slider to move in the second direction.

* * * * *